United States Patent

Shinohara et al.

[11] Patent Number: 5,951,617
[45] Date of Patent: Sep. 14, 1999

[54] APPARATUS AND METHOD FOR DETECTING MISFIRES IN INTERNAL COMBUSTION ENGINE

[75] Inventors: Susumu Shinohara, Toyota; Tomohiro Fujita, Toyota, both of Japan

[73] Assignee: Toyota Jidosha Kabushiki Kaisha, Toyota, Japan

[21] Appl. No.: 08/908,966

[22] Filed: Aug. 8, 1997

[30] Foreign Application Priority Data

Aug. 9, 1996 [JP] Japan .................................. 8-211620
May 29, 1997 [JP] Japan .................................. 9-139743

[51] Int. Cl.⁶ ........................... F02D 45/00; G01M 15/00
[52] U.S. Cl. ........................... 701/110; 73/116; 73/117.3; 123/419; 123/436
[58] Field of Search ................................. 701/101, 110, 701/111; 73/116, 117.2, 117.3, 118.1; 123/419, 436

[56] References Cited

U.S. PATENT DOCUMENTS

| | | | |
|---|---|---|---|
| 5,297,047 | 3/1994 | Matsuno | 364/551.01 |
| 5,307,670 | 5/1994 | Imai et al. | 73/117.3 |
| 5,307,671 | 5/1994 | Akase | 73/117.3 |
| 5,485,374 | 1/1996 | Takaku et al. | 701/111 |
| 5,528,929 | 6/1996 | Ikebuchi | 73/116 |
| 5,528,931 | 6/1996 | James et al. | 73/117.3 |
| 5,670,713 | 9/1997 | Machida et al. | 73/116 |
| 5,734,100 | 3/1998 | Kishimoto et al. | 73/117.3 |
| 5,809,969 | 9/1998 | Fiaschetti et al. | 123/436 |

FOREIGN PATENT DOCUMENTS

A-4-265475  9/1992  Japan .

*Primary Examiner*—George Dombroske
*Attorney, Agent, or Firm*—Oliff & Berridge, PLC

[57] ABSTRACT

An apparatus for detecting misfires in an internal combustion engine that is mounted on a vehicle. A plurality of cylinders is defined in the engine, and a piston accommodated in each cylinder to reciprocate in the cylinder. A crankshaft is connected with the piston, the crankshaft is rotated by the reciprocal movement of the piston. An engine speed sensor is provided for detecting the rotating speed of the crankshaft. An electronic control unit (ECU) computes the deviation of rotating speed of the crankshaft corresponding to each cylinder based on the detected engine speed, and the deviation is proportional to the engine load. The ECU costs a leaning value based on the computed deviation, wherein the learning value is used for detecting the misfires in the engine. A memory is provided for storing the learning value. Several sensors are provided for detecting a running condition of the engine, wherein the condition is included the engine load. The ECU renews the learning value stored in the memory based on the detected condition of the engine. The ECU determines whether the misfires occurs in each cylinder based on the difference between the deviation and the learning value. The ECU renews the learning value when the engine load is less than a predetermined value.

40 Claims, 16 Drawing Sheets

| Learning Range (rpm) | Speed Range (rpm) |
|---|---|
| 2400~2800 | 2200~3000 |
| 3200~3600 | 3000~3800 |
| 4000~4400 | 3800~4600 |
| 4800~5200 | 4600~5400 |
| 5600~6000 | 5400~6200 |

APPARATUS AND METHOD FOR DETECTING MISFIRES IN INTERNAL COMBUSTION ENGINE

BACKGROUND OF THE INVENTION

The present invention relates to an apparatus for detecting misfires in the cylinders of an internal combustion engine on a vehicle.

Generally, in a multi-cylinder type engine, combustion variation is caused by the following reasons:

(1) Complexity of the shape of the intake pipe;

(2) Uneven distribution of intake air caused by intake air interference. Intake air interference refers to the interference of compression waves of intake air between the intake ports and a converged part of the intake manifold.

(3) Combustion temperature differences between the cylinders; and (4) Variations in the volume of the cylinder's combustion chamber and variations in the shape of the pistons generated during the machining of tho pistons.

In recent high-performance engines, which generate high power and have low fuel consumption, deterioration or malfunction of injectors and ignition plugs often causes variations in combustion among the cylinders. The combustion variation may result in intermittent misfires.

Misfires not only cause the engine torque to fluctuate, but also discharge unburned fuel from the misfiring cylinder and leak unburned fuel out of the engine. It is therefore necessary to detect misfires and to inform the driver of the occurrence of a misfire as soon as the misfire occurs. This allows the driver to deal with misfires as early as possible. Several techniques for quickly detecting misfires and informing a driver of the misfires have been proposed.

One of the proposed techniques includes an engine crankshaft having a rotor for detecting misfires. The rotor has plurality of teeth that project from the circumferential surface. Equal intervals are provided between each pair of adjacent teeth. A sensor is opposed to the circumferential surface of the rotor. The sensor detects passage of each tooth. When the rotor is rotating, the time period during which the rotor rotates by a certain number of degrees is computed. A determination value is computed based on the computed time period. Misfires are detected if the determination value is greater than a determination level.

The teeth on the rotor may be displaced. The interval between each pair of tooth should be equal. However, the location of each tooth will be slightly displaced from where it should be if the machining of the teeth is not as accurate as required. This displacement of teeth location is referred to as teeth displacement. Teeth displacement as used herein includes axial displacement. Axial displacement is displacement of the teeth along the axis of the crankshaft. One of the causes for the axial displacement is crankshaft torsion. When determining that determination level, the teeth displacement must be taken into consideration. In the prior art apparatuses, the determination level is learned and renewed for adequately adjusting the determination level.

For example, Japanese Unexamined Patent Publication No. 4-265475 discloses an apparatus that detects a cylinder in which combustion has been stopped by clogging or malfunction of the corresponding injector. The apparatus compensates for teeth displacement when the supply of fuel to the engine is temporarily stopped, or when a fuel cut-off operation is executed. Since fuel is not combusted during a fuel cut-off operation, detection of the teeth displacement is not affected by misfires. During a fuel cut-off operation, a test cylinder is selected. Then, the time during which the associated piston moves from one point to another is computed. In other words, the piston speed is computed in the test cylinder.

In the same manner, the piston speed is detected in another two cylinders, or reference cylinder, the combustion strokes of which are before and after the combustion stroke of the test cylinder. The average piston speed of the reference two cylinders is computed. A compensation value is computed based on the difference between the piston speed of the test cylinder and the average piston speed of the reference cylinders. A misfire determination level of the test cylinder is computed based on the piston speed of the test cylinder by referring to function data stored in a memory. The determination level is then compensated with the above computed compensation value and stored in the memory. The compensated determination level is thus learned.

Thereafter, when the fuel cut-off operation is finished and fuel injection is started again, a determination value for detecting the combustion state of the test cylinder is computed based on the piston speed in the test cylinder and the average piston speed of the reference cylinders. If the determination value is smaller than the determination level, it is judged that a misfire has occurred in the test cylinder.

As described above, a misfire determination level is learned, or compensated and stored in the memory, when a fuel cut-off operation is executed. This eliminates errors caused by teeth displacement of the rotor when misfire detection is performed. The accuracy of misfire detection is thus improved.

In the above described prior art, the determination level is learned, or compensated and stored in the memory, only when a fuel cut-off operation is performed. Generally, a fuel cut-off operation is performed when the vehicle speed is in a certain range, the crankshaft speed is in a certain range and an idle switch is on (when the throttle valve is fully closed). However, such a fuel cut-off operation is not often performed when the vehicle is moving. This results in the determination level for each cylinder being rarely learned, or rarely compensated and stored in the memory.

Further, even if a fuel cut-off operation is performed, it generally lasts for very short time. Therefore, there is not sufficient time for learning the determination level. When the learning of the determination level is rarely performed, the accuracy of the misfire detection is degraded.

SUMMARY OF THE INVENTION

Accordingly, it is an objective of the present invention to provide a misfire detecting apparatus having improved accuracy.

To achive the above objective, the present invention is provided for an apparatus for detecting misfires in an internal combustion engine of a vehicle, the apparatus includes a plurality of cylinders defined in the engine, a piston accommodated in each cylinder to reciprocate in the cylinder, a shaft connected with the pistons, tho shaft being rotated by the reciprocal movement of the pistons, a speed sensor for detecting the rotating speed of the shaft a deviation computer for computing the deviation between earlier and later times of the rotating speed of the shaft at a selected portion of the cycle of a selected piston based on the detected speed of the shaft, wherein the deviation is affected by the load on the engine, a setting means for setting a learning value based on the computed deviation, wherein the learning value is a reference value used for detecting misfires in the cylinders, a memory for storing the learning value, a condition sensor for detecting a running condition of the engine, wherein the condition is indicative of the load on the engine, a learning means for renewing the learning value stored in the memory based on the detected condition of the engine, a first determiner for determining whether a misfire has occurred in each cylinder based on tho difference between the deviation and the learning value, and means for permitting the renewing the learning value by the learning means only when the engine load is less than a predetermined value.

Also, the present invention is provided for a method for detecting misfires in an internal combustion engine, the engine having a plurality of cylinders defined in the engine, a piston accommodated in each cylinder to reciprocate in the cylinder, a shaft connected with the piston, the shaft being rotated by the reciprocal movement of the piston; the method includes detecting the rotating speed of the shaft, computing the deviation between an earlier time and a later time of the rotating speed of the shaft for a selected portion of the cycle of a selected cylinder based on the detected speed of the shaft, setting a learning value based on the computed deviation, wherein the learning value is used for detecting the misfires in the engine, storing the learning value in a memory, detecting a running condition of the engine, wherein the running condition is indicative of the load on the engine, renewing the learning value stored in the memory based on the detected condition of the engine, determining whether a misfire has occurred in the selected cylinder based on the difference between the deviation and the learning value, and permitting the renewing the learning value by the learning means only when the engine load is less than a predetermined value.

Other aspects and advantages of the invention will become apparent from the following description, taken in conjunction with the accompanying drawings, illustrating by way of example the principals or the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
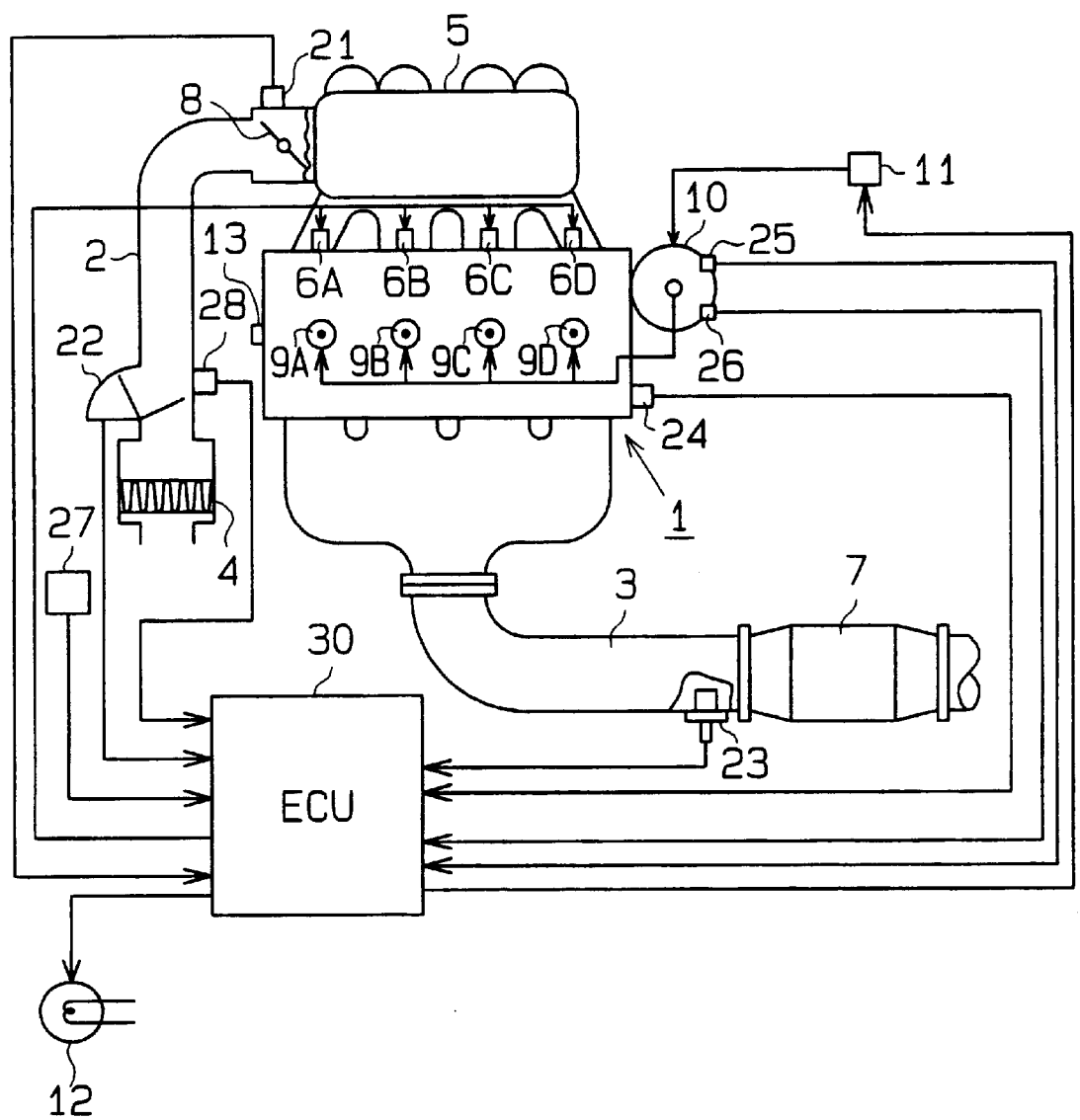
FIG. 1 is a schematic drawing showing a misfire detecting apparatus for an engine according to one embodiment of the present invention.

An apparatus for detecting misfires in internal combustion engines according to a first embodiment of the present invention will hereafter be described referring to the drawings.

As shown in FIG. 1, an in-line four cylinder type gasoline engine 1 has an intake passage 2 and an exhaust passage 3. An air cleaner 4 is located in the vicinity of the inlet of the intake passage 2. A surge tank 5 is located midway in the intake passage 2. Injectors 6A, 6B, 6C and 6D are located on the downstream side of the surge tank S. Each injector 6A, 6B, 6C and 6D corresponds to one of the cylinders of the engine 1 for injecting fuel into the cylinder. A catalytic converter 7 is located in the vicinity of the outlet of the exhaust passage 3. The converter 7 contains a three way catalyst for cleaning exhaust gas.

The engine 1 draws atmospheric air through the air cleaner 4 and the intake passage 2. The air is then mixed with the fuel injected from each injector 6A to 6D. The air-fuel mixture is drawn into combustion chambers and combusted. This generates the power of the engine 1. Resultant exhaust gas flows into the exhaust passage 3 and then is discharged to the outside through the converter 7.

A throttle valve 8 is provided in the intake passage 2 and is located at the upstream side of the surge tank 5. The valve 8 is operably connected to an acceleration pedal (not shown). The amount of air drawn into the intake passage 2, or the intake air amount, is controlled by changing the opening of the valve 8.

A throttle sensor 21 is arranged in the vicinity of the throttle valve 8 to detect the opening angle (throttle angle TA) of the valve 8. A conventional movable vane type air flowmeter 22 is provided at the downstream side of the air cleaner 4 for measuring the amount of intake air GA, which is converted into weight, through the intake passage 2. A load value GN, which corresponds to a load of the engine 1, is computed by an electronic control unit (ECU) 30, which will be described later. The ECU 30 computes the load value GN based on the intake air amount GA.

An oxygen sensor 23 is also provided in the exhaust passage 3 for detecting the concentration of oxygen in the exhaust gas. The air-fuel ratio of the engine 1 is feedback controlled based on signals from the oxygen sensor 23. The engine 1 is provided with a coolant temperature sensor 24, which detects the temperature of the engine coolant THW.

Ignition plugs 9A, 9B, 9C and 9D are provided on each cylinder of the engine 1. A distributor 10 connected to the plugs 9A to 9D for distributing high voltage electricity from an ignitor 11 to the plugs 9A to 9D in synchronization with the crank angle of the engine 1. The firing timing of the plugs 9A to 9D is determined by the timing with which the ignitor 11 outputs the high voltage.

A rotor (not shown) is secured on a crankshaft 13. The rotor has a plurality of teeth and rotates integrally with the crankshaft 13. An engine speed sensor 25 is provided in the distributor 10 for detecting the rotating speed of the crankshaft 13, or the engine speed NE, based on the rotation of the rotor. The speed sensor 25 outputs a pulse at every 30° of the crank angle (CA). A cylinder distinguishing sensor 26 is also provided in the distributor 10 to detect a reference position on the rotor that corresponds to a certain rotational phase of the crankshaft 13 as the rotor rotates. The distinguishing sensor 26 outputs a signal when detecting the reference position of the rotor. Two turns of the crankshaft 11 corresponds to four strokes, or one cycle, of the engine 1. The distinguishing sensor 26 thus outputs a reference position signal GS at every 720° CA.

A vehicle speed sensor 27 is provided in an automatic transmission, which is coupled to the engine 1, for detecting the vehicle speed SP. A temperature sensor 28 is provided in the intake passage 2 for detecting the temperature of intake air (intake air temperature) THA.

Although not shown in the drawings, the apparatus according to this preferred embodiment has a conventional exhaust gas recirculation (EGR) mechanism and a purge control mechanism. The EGR mechanism includes an EGR passage and an EGR valve located midway in the EGR passage. The EGR passage connects the downstream side of the throttle valve 8 in the intake passage 2 to the exhaust passage 3. The EGR valve includes a valve seat, a valve body, and a step motor. The opening area of the EGR valve is altered by causing the step motor to intermittently displace the valve body with respect to the valve seat. When the EGR valve opens, some of the exhaust aga cont into the exhaust passage 3 enters the EGR passage. The gas is then drawn into the intake passage 2 via the EGR valve. In other words, some of the exhaust gas is recirculated by the EGR mechanism and returned to intake air-fuel mixture. The recirculation amount of the exhaust gas is adjusted by changing the opening amount of the EGR valve.

The purge control mechanism includes a vapor line, a purge line and a canister. The vapor line connects the upper portion of a fuel tank to the canister. The canister draws in and collects fuel vaporized in the fuel tank through the vapor line. The canister contains an adsorbent comprised of activated carbon, which temporarily adsorbs vaporized fuel. The purge line connects the canister and a sensing port located in the vicinity of the throttle valve 8. The fuel collected in the canister is supplied to the engine 1 by way of the purge line and the intake passage 2. A purge control valve, which is a vacuum switching valve, is provided in the purge line. The purge control valve opens and closes the purge line for adjusting the amount of vaporized fuel, which is conducted from the canister to the intake passage 2. The opening of the purge control valve is duty controlled.

A warning lamp 12 is arranged on an instrument panel in front of the driver's seat for informing the driver of occurrence of misfires. The lamp is lit when a misfire occurs.

The injectors 6A to 6D, the ignitor 11 and the warning lamp 12 are electrically connected to and are controlled by the ECU 30. The ECU 30 performs a conventional fuel injection control and an injection timing control and detects misfires at the combustion stroke of each cylinder.

Figure 2:
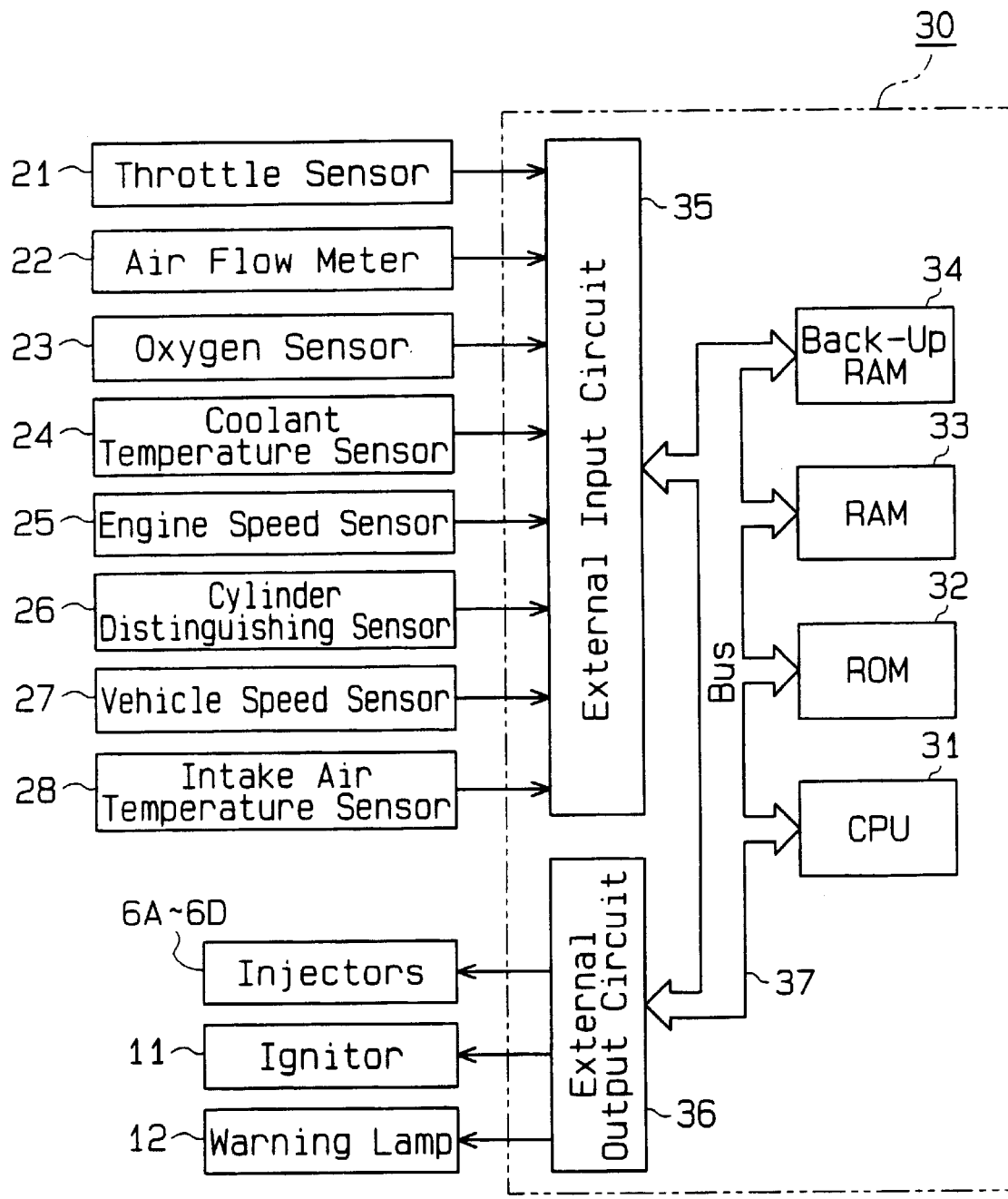
FIG. 2 is a block diagram showing the construction of an electronic control unit (ECU)

As shown in the block diagram of FIG. 2, the ECU 30 includes a central processing unit (CPU) 31, a read-only memory (ROM) 32, a random access memory (RAM) 33, a backup RAM 34, an external input circuit 35 and an external output circuit 36. The devices 31 to 34 are connected to the external input circuit 35 and the external output circuits 36 by a bus 37 to form a logical computing circuit. A predetermined control program is prestored in the ROM 32. The RAM 33 temporarily stores the computed results of the CPU 31. The backup RAM 34 prestores data. The CPU 31 receives signals from the sensors 21 to 27 as input values through the external input circuit 35. Based on the input values, the CPU 31 controls the injectors 6A to 6D, the ignitor 11 and the warning lamp 12 via the external output circuit 36.

Various steps for detecting misfires in this engine will hereafter be described with reference to FIGS. 3 to 12.

Figure 3:
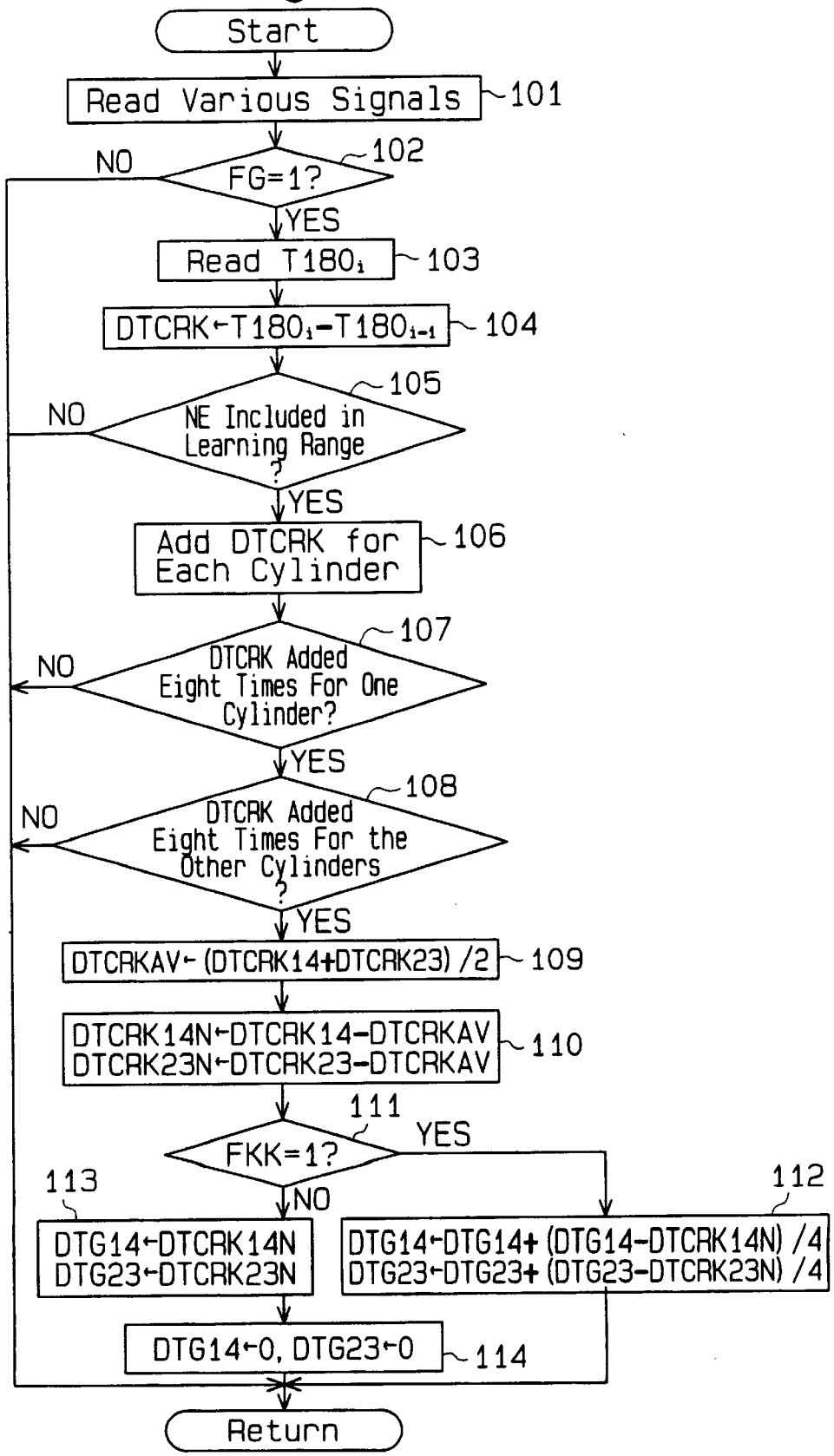
FIG. 3 is a flowchart showing a routine for setting a learning value.

FIG. 3 shows a learning value setting routine for setting (learning and renewing) a learning value. This routine is an interrupt executed by the ECU 30 at every predetermined crank angle (for example 30° CA).

When this routine is performed, the ECU 30 reads various signals including a reference position signal GS from the cylinder distinguishing sensor 26 and the engine speed NE from the engine speed sensor 25 at step 101. The ECU 30 also reads the values of various flags such as a learning flag FG, which are given valued in other routines.

At step 102, the ECU 30 determines whether the learning flag FG has a value of one. The flag FG is set in a learning initiation flag setting routine, which will be described below. The flag FG is set at one when learning and renewing of a learning value DTG are permitted and is set at zero when learning and renewing of the learning value DTG are prohibited. When the flag FG is zero, the ECU 30 judges that learning and renewing of the learning value DTG are prohibited and temporarily terminates the subsequent processing. When the flag FG is one, the ECU 30 judges that the learning and renewing of the value DTG are temporarily permitted and proceeds to step 103.

At step 103, the ECU 30 computes a time period $T180_i$ during which the crankshaft 13 rotates one-half turn, or turns 180° CA. The computed time period $T180_i$ corresponds to a time period for one stroke of the piston in a currently selected cylinder. In this preferred embodiment, ignition is performed in the cylinders in order of a first cylinder #1, a third cylinder #3, a fourth cylinder #4 and a second cylinder #2.

At step 104, the ECU 30 subtracts the time $T180_{i-1}$ of a cylinder, in which ignition has been performed prior to the ignition in the currently selected cylinder, from the time T1801 of the currently selected cylinder. The ECU 30 then sets the difference between $T180_i$ and $T180_{i-1}$ as a rotation fluctuation value DTCRK of the currently selected cylinder. For example, when the cylinder #1 is currently selected, the rotation fluctuation value DTCRK of the cylinder #1 is calculated by subtracting the time $T180_{i-1}$ of the second cylinder #2 from the time $T180_i$ or the first cylinder #1.

Figures 4, 5:
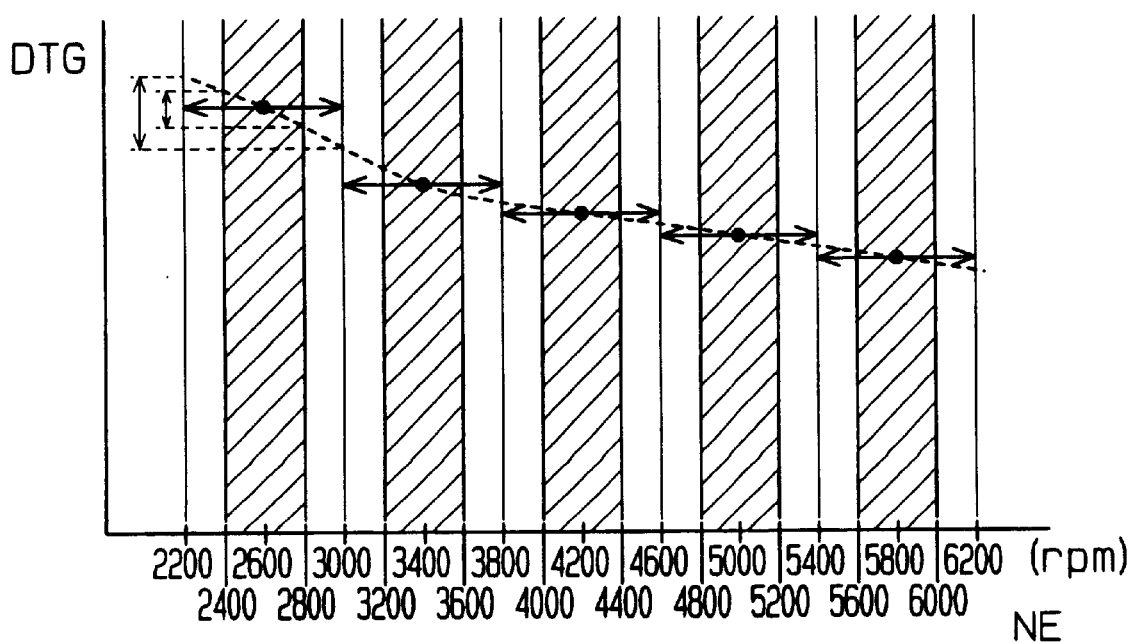
FIG. 4 is a table showing the relationship between learning ranges and engine speed ranges.
FIG. 5 is a graph showing the relationship between learning ranges and speed ranges.

At step 105, the ECU 30 determines whether the engine speed NE is in one of a predetermined group of learning ranges. Specifically, as shown in FIGS. 4 and 5, the ECU 30 determines whether the engine speed NE is in one of the diagonally shaded ranges in FIG. 5. The ranges lie between 2400 rpm and 2800 rpm, between 3200 rpm and 3600 rpm, between 4000 rpm and 4400 rpm, between 4800 rpm to 5200 rpm and between 5600 rpm and 6000 rpm. The engine speed is divided into these ranges in consideration of teeth displacements of the rotor (including axis displacement). The teeth displacement greatly affects the rotation fluctuation value DTCRK. The influence of teeth displacements on DTCRK varies depending on the engine speed NE.

Since the influence of teeth displacement changes in accordance with the engine speed NE, the learning ranges are set narrower than the divided ranges of the engine speed NE. This is because the learning value DTG also changes in relation with changes of the engine speed NE as shown in FIG. 5. Narrowing the learning ranges reduces variations of the learning value DTG caused by changes in the engine speed NE. For example, when the engine speed NE is in the range between 2200 rpm and 3000 rpm, setting the learning range between 2400 rpm to 2800 rpm dramatically reduces variations of the learning value DTG. This improves the accuracy of misfire detection, which will be described below.

The highest learning range of the engine speed NE is between 5600 rpm to 6000 rpm. Therefore, even if the engine races when the shift lever is in the neutral position, learning is performed. The second highest learning range of the engine speed NE is between 4800 rpm to 5200 rpm. Thus, learning is performed even if the throttle valve 8 is fully closed immediately after a vehicle is accelerated by a wide open throttle (WOT) operation when the shift lever is in the drive position.

At step 105, if the engine speed NE is not in one of the learning ranges, the ECU 30 decides not to perform learning and renewing of the learning value DTC in the current routine and temporarily terminates the subsequent processing. If the engine speed NE is in one of the learning ranges, the ECU 30 proceeds to step 106 to perform learning and renewing of the learning value DTG of that learning range.

Figure 6:
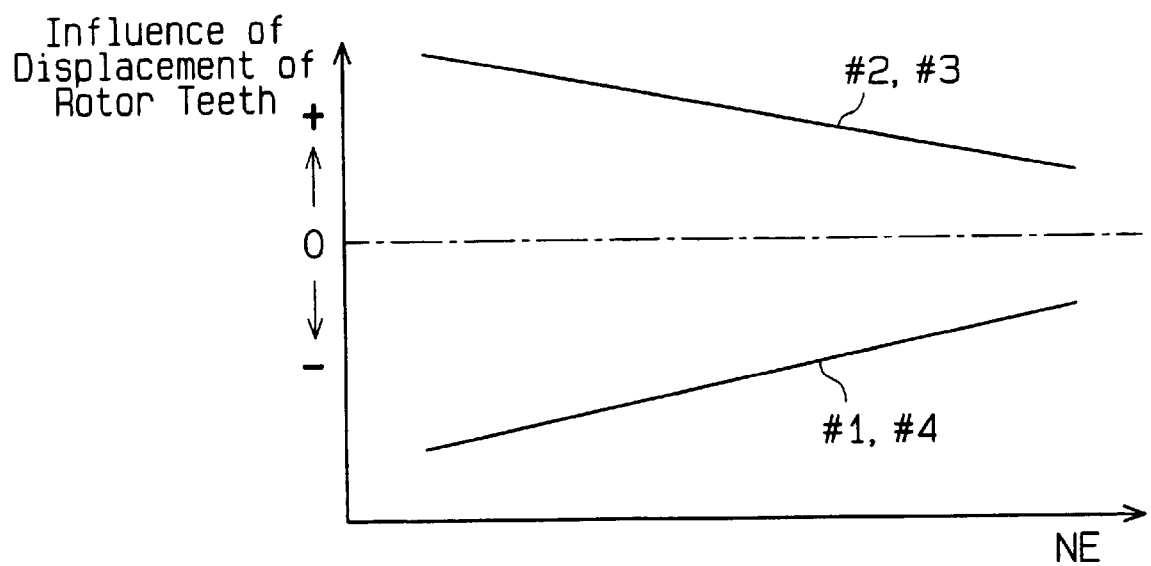
FIG. 6 is a graph showing the relationship between the engine speed and teeth displacement the cylinders.

At step 106, the ECU 30 accumulates the rotation fluctuation value DTCRK of each cylinder. The position on the rotor at which a time T180 of a cylinder is detected is the same for a group of pistons. Thus, as shown in FIG. 6, the influence of rotor teeth displacement is the same for pistons that belong to the same group. In this preferred embodiment, the first cylinder #1 and the fourth cylinder #4 are in the same group, and the second cylinder #2 and the third cylinder #3 are in the same group. The pistons of cylinders belonging to the same group behave in substantially the same manner. Rotation fluctuation in cylinders of the same group is thus substantially the same. Therefore, the rotation fluctuation values DTCRK of cylinders of the same group are accumulated as the same rotation fluctuation value. For example, the rotation fluctuation value of the first cylinder #1 is computed as DTCRK14 and the rotation fluctuation value of the fourth cylinder #4 is also computed ac DTCRK14. Then, DTCRK14 of the cylinder #1 and DTCRX14 of the cylinder #4 are added together Likewise, the rotation fluctuation value of the second cylinder #2 is computed as DTCRK23 and the rotation fluctuation value of the third cylinder #3 is also computed as DTCRK23. Then DTCRK23 of the cylinder #2 and DTCRK23 of the cylinder #3 are added together.

At step 107, the ECU 30 determines whether the rotation fluctuation value DTCRK of the selected cylinder has been accumulated for a predetermined number of times (eight times in this preferred embodiment). If the rotation fluctuation value DTCRK (DTCRK14 or DTCRK23) has been accumulated less than eight times, the ECU 30 temporarily terminates the subsequent processing. If the rotation fluctuation DTCRK has been added up at least eight times, the ECU 30 proceeds to step 108.

At stop 108, the ECU 30 determines whether the rotation fluctuation value DTCRK of the other cylinders (DTCRK23 or DTCRK14) has been accumulated for a predetermined number of times (eight times in this preferred embodiment). If the rotation fluctuation value DTCRK has been accumulated less than eight times, the ECU 30 temporarily terminates the subsequent processing. If the rotation fluctuation value DTCRK has been added up at least eight times, the ECU 30 proceeds to step 109.

At Step 109, the ECU 30 computes the average DTCRKAV of the rotation fluctuation value DTCK14 of the first and fourth cylinders #1 and #4 and the rotation fluctuation value DTCRK23 of the second and third cylinders #2 and #3. That is, the ECU 30 add up the rotation fluctuation values DTCRK14 and DTCRK23 and divides the resultant value by two. Conditions for learning are generally satisfied when the vehicle is decelerating. It is therefore assumed that the rotation fluctuation values DTCRK14, DTCRK23 include changes in time T180 as well as the teeth displacement of the rotor. On the other hand, when the vehicle is moving at a constant speed, the time period during which the crankshaft 13 rotates one half turn is constant. Thus, there is normally no difference between the time period required for one half turn of the crankshaft and the time period of the previous half turn. Therefore, the value obtained by adding up the rotation fluctuation value DTCRK14 and that rotation fluctuation value DTCRK23 is theoretically zero. If the added up value of DTCRK14 and DTCRK23 is a positive value, it is determined that the vehicle is decelerating.

At step 110, the ECU 30 eliminates a component of the rotation fluctuation value of the deceleration of the vehicle. Specifically, the ECU 30 computes a reference rotation fluctuation value DTCRK14N of the cylinders #1, #4 by subtracting tho average DTCRKAV computed in step 109 from the rotation fluctuation value DTCRK14. Likewise, the ECU 30 computes a reference rotation fluctuation value DTCRK23N of the cylinders #2, #3 by subtracting the average DTCRKAV from the rotation fluctuation DTCRK23.

At step 111, the ECU 30 determines whether a permission flag FKK, which is set in another routine, has a value of one. If the flag FKK is one, the ECU 30 judges that the learning value DTG has not changed significantly, and proceeds to step 112. A flag FKK is allotted to each speed range of the engine 1 in a permission flag setting routine, which will be described below. When the rotation fluctuation value DTCRK is significantly changed, for example, by replacement of the timing belt of the engine 1, the flag FKK is set to zero. In other cases, the flag FKK is set to one.

At step 112, the ECU 30 abates the learning value DTG DTGl4 or DTG23) of the speed range to which the current engine speed NE belongs, and temporarily terminates the subsequent processing. For example, when the cylinder #1 or the cylinder #4 is selected, the ECU 30 sets the learning value DTGI4 of the cylinders #1, #4. Specifically, the ECU 30 subtracts the reference rotation fluctuation value DTCRK14N from the learning value DTG14 obtained in the previous routine and divides the computed value by four. That ECU 30 renews the learning value DTG14 by adding the resultant value to the learning value DTG14 of the previous routine. Similarly, when the cylinder #2 or the cylinder #3 is selected, the ECU 30 sets the learning value DTG23 of the cylinders #2, #3. Specifically, the ECU 30 subtracts the reference rotation fluctuation value DTCRK23N from the learning value DTG23 obtained in the previous routine and divides the computed value by four. The ECU 30 renews the learning value DTG23 by adding the resultant value to the learning value DTG23 of the previous routine.

At step 111, if the permission flag EKR is zero, the ECU 30 judges that the rotation fluctuation value DTCRK has been significantly changed, for example, by replacement of the timing belt of tho engine 1, and proceeds to step 113.

At step 113, the ECU 30 fundamentally renews the learning value DTG (DTG14 or DTG23) of the speed range to which the current engine speed NE belongs. For example, when the cylinder #1 or the cylinder #4 is selected, the ECU 30 replaces the learning value DTG14 with the reference rotation fluctuation value DTCRK14N regardless of the current learning value DTG14. Similarly, when the cylinder #2 or the cylinder #3 is selected, the ECU 30 replaces the learning value DTG23 with the reference rotation fluctuation value DTCRK23N regardless of the current learning value DTG23.

At step 114, the ECU 30 resets the leaning values DTG (DTG14 and DTG23) of the other speed ranges to zero and temporarily terminates tho subsequent processing.

As described above, in the learning value setting routine, the learning values DTG14 and DTG23, each corresponding to a cylinder group, are computed for the speed range to which the current engine speed NE belongs.

Figure 7:
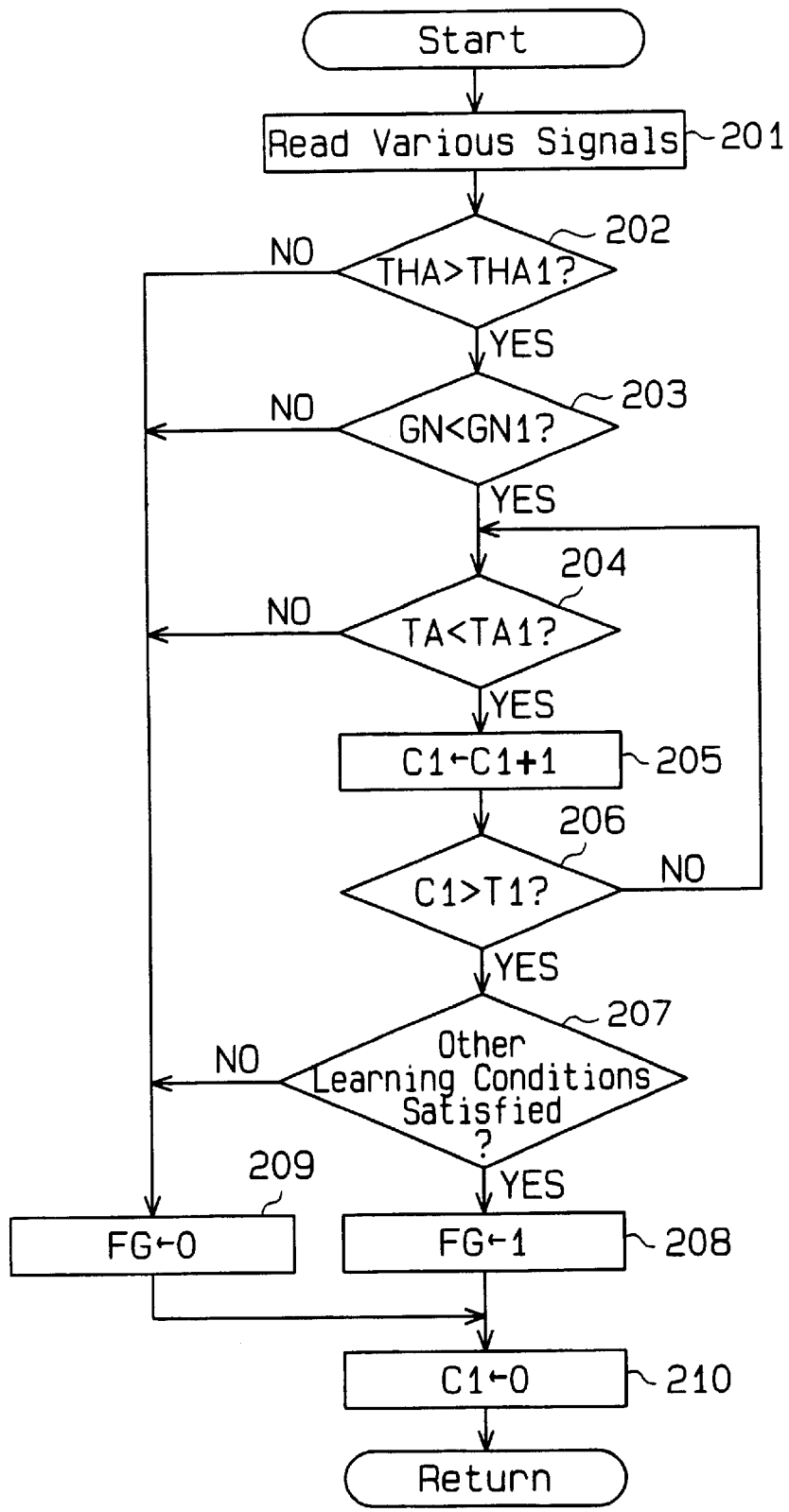
FIG. 7 is a flowchart showing a routine for setting a flag that initiates a learning procedure.

The learning initiation flag setting routine will hereafter be described with reference to FIG. 7. This routine is designed for setting the learning flag FG, which is the subject of the determination in step 102. This routine is an interrupt executed by the ECU 30 at every predetermined crank angle.

When the processing enters this routine, the ECU 30 reads various signals including an intake air temperature THA, the intake air amount GA, the throttle angle TA and the engine speed NE from the intake temperature sensor 28, the air flowmeter 22, the throttle sensor 21 and the engine speed sensor 25, respectively, at step 201. The ECU 30 also computes a load value GN based on the intake air amount GA.

At step 202, the ECU 30 determines whether the intake air temperature THA is higher than a predetermined temperature THA1. If the intake air temperature THA is equal to or lower than the temperature THA1, the ECU 30 judges that the conditions for performing learning are not satisfied and proceeds to step 209. At step 209, the ECU 30 sets the learning flag FG to zero for prohibiting learning of the learning value DTG. If the intake air temperature THA is higher than the predetermined temperature THA1, the ECU 30 proceeds to step 203.

Figure 8:
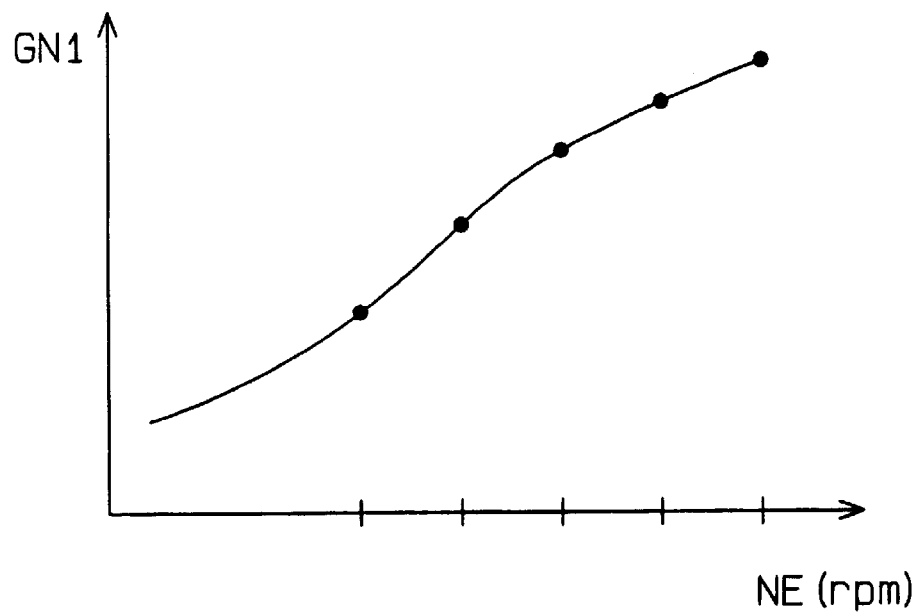
FIG. 8 is a graph of function data showing the relationship between tho engine speed and the reference load value.

At atop 203, tho ECU 30 determines whether the load value GN of the current engine speed NE is smaller than a reference value GN1. As shown in FIG. 8, the reference value GN1 is previously determined in relation to the engine speed NE. If the load value GN of the current engine speed NE is equal to or greater than the corresponding reference value GN1, it indicates that a relatively great amount of combustion is taking place in the engine 1. In this running condition of the engine 1, the ECU 30 judges that the great amount of combustion affects the renewing of the learning value DTG and proceeds to step 209. At step 209, the ECU 30 sets the learning flag FG to zero for prohibiting learning of the learning value DTG.

When the determination of step 203 is satisfied, a relatively small amount of combustion is taking place in the engine 1. The ECU 30 judges that the small amount of combustion has little influence on the renewing of the learning value DTG and proceeds to step 204. In this preferred embodiment, the learning and renewing of the learning value DTG are permitted over a relatively wide range of the load value GN (GN<GN1) even if a fuel cut-off operation is being performed (however, the determinations of stops 204 and 207, which will be described below, must be satisfied).

Figure 9:
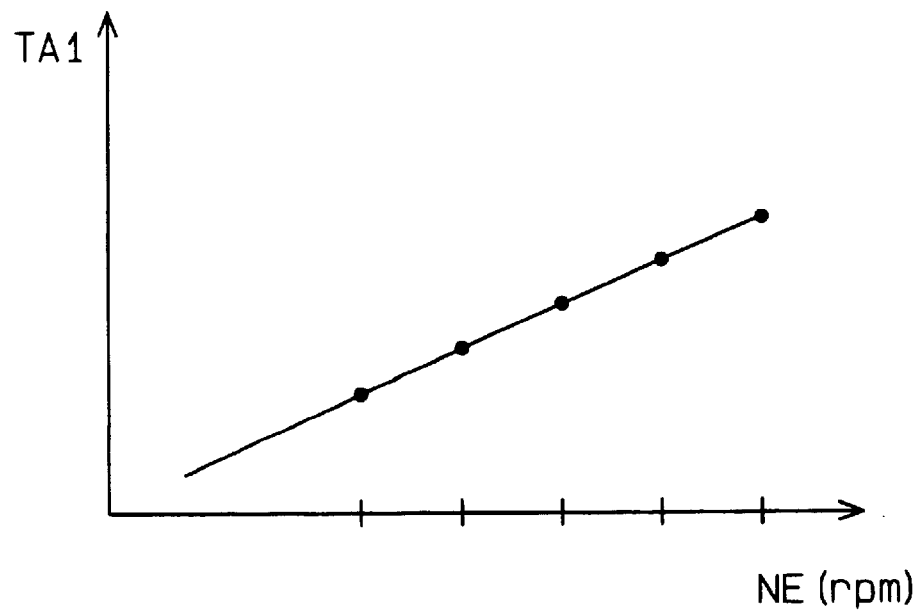
FIG. 9 is a graph of function data showing the relationship between the engine speed and the reference throttle valve opening value.

At step 204, the ECU 30 determines whether the value of the throttle angle TA is smaller than a reference value TA1. As shown in FIG. 9, the reference value TA1 is previously determined in relation with the engine speed NE. If the value of the throttle angle TA is equal to or greater than the corresponding reference value TAl, it indicates that a relatively large amount of combustion is taking place in the engine 1. In this running condition of the engine 1, the ECU 30 judges that the large amount of combustion affects the learning and renewing of the learning value DTG and proceeds to step 209. At step 209, the ECU 30 sets the learning flag FG to zero for prohibiting learning of the learning value DTG. When the value of the throttle angle TA is smaller than the corresponding reference value TA1, a relatively small amount of combustion is taking place in the engine 1. The ECU 30 judges that the small amount of combustion has little influence on the learning and renewing of the learning value DTG and proceeds to step 205.

At step 205, the ECU 30 increments a counter value Cl, which is stored in a counter, by one. At step 206, the ECU 30 determines whether the counter value C1 exceeds a predetermined time T1 (for example fifty milliseconds). If the counter value C2 exceeds the time T1, the ECU 30 proceeds to step 207. If the counter value C1 is still smaller than the time T1, the ECU 30 repeats the processing of steps 204 to 206 until the counter value C1 exceeds the time T1.

At step 207, the ECU 30 judges whether other learning conditions, which will be described below, are satisfied. If the other learning conditions are not satisfied, the ECU 209 proceeds to step 209 and prohibits the learning of the learning value DTG.

If the other learning conditions are satisfied, the ECU 30 judges that all the learning conditions are satisfied and proceeds to step 208. At step 208, the ECU 30 sets the learning flag FG to one for permitting the learning and renewing of the learning value DTG.

The ECU 30 moves to step 210 from either step 208 or 209. At step 210, the ECU 30 resets the counter value C1 to zero and temporarily terminates the routine.

In the above described routine, the ECU 30 initially judges whether the load value GN is smaller than the reference value GN1 and whether the predetermined time T1 has elapsed since the throttle angle TA became smaller than the reference value TA1. Further, if the other learning conditions are satisfied, the ECU 30 sets the learning flag FG to one for permitting the learning and renewing of the learning value DTG. In the other cases, the ECU 30 sets the flag FG to zero.

Figure 10:
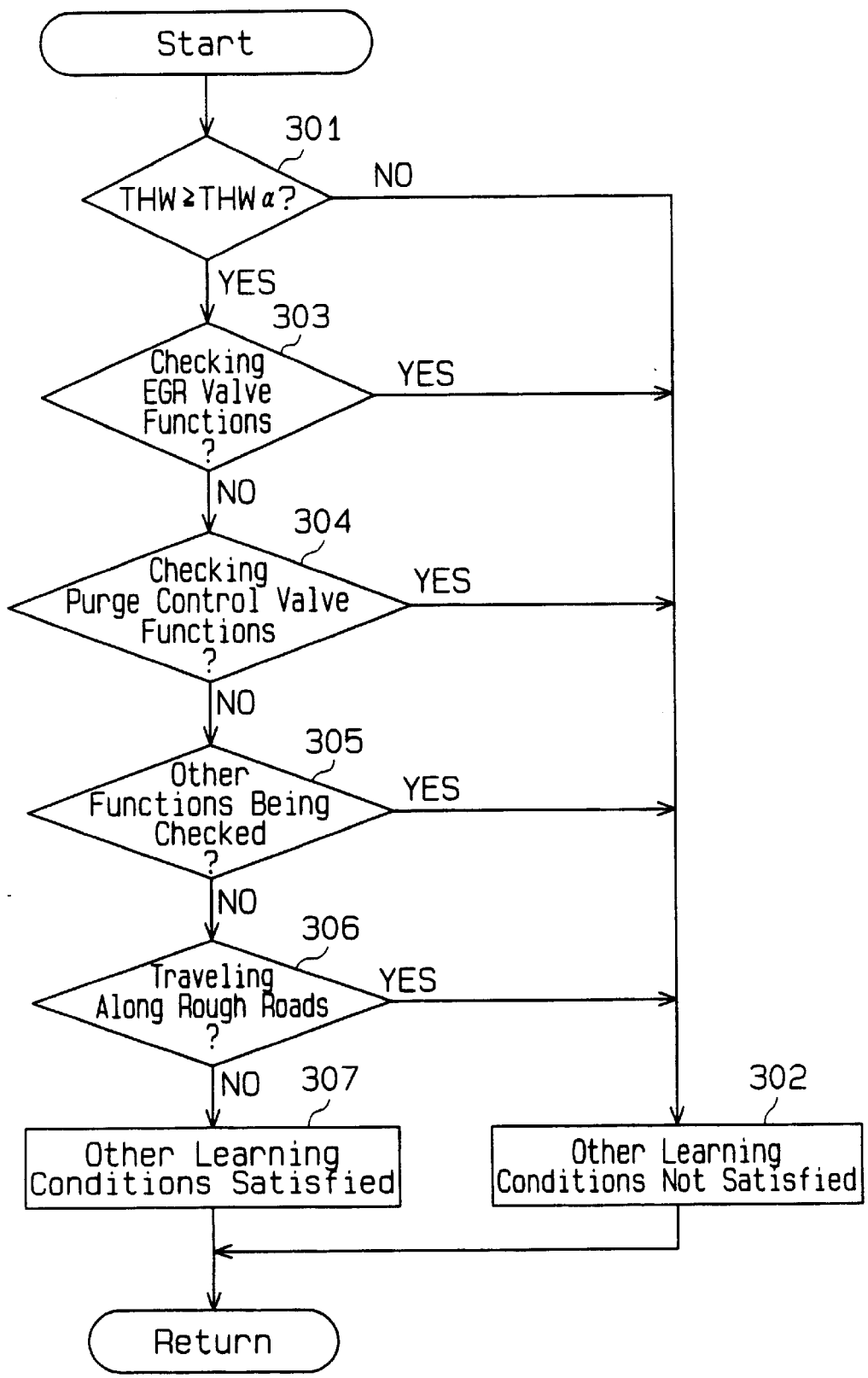
FIG. 10 is a flowchart showing a routine for checking other learning conditions.

Processing of step 207 will now be described with reference to FIG. 10. The routine of FIG. 10 is an interrupt executed by the ECU 30 at every predetermined crank angle.

When the processing enters this routine, the ECU 30 initially determines whether the current coolant temperature THW is equal to or higher than a predetermined coolant temperature THWa. If the coolant temperature THW is lower then the temperature THWA, the ECU 30 proceeds to step 302. At step 302, the ECU 30 judges that the other learning conditions are not satisfied and temporarily terminates the subsequent processing.

If the coolant temperature TRW is equal to or higher than the temperature THWα, the ECU 30 proceeds to step 303. At step 303, the ECU 30 determines whether the function of the EGR valve is currently being tested. Testing the EGR valve subtly affects on the pressure in the surge tank 5. Therefore, if the EGR valve is being tested, the ECU 30 proceeds to step 302 for prohibiting the learning and renewing of the learning value DTG. If the EGR valve is not being tested, on the other hand, the ECU 30 proceeds to step 304.

At step 304, the ECU 30 determines whether the function of the purge control valve is currently being tested. Testing the purge control valve subtly affects the pressure in the surge tank 5. Therefore, if the purge-control valve is being tested, the ECU 30 proceeds to step 302 for prohibiting the learning and renewing of the learning value DTG. If the purge control valve is not being tested, on the other hand, the ECU 30 proceeds to step 306.

At step 305, the ECU 30 determines whether other testing operations that subtly affect the pressure in the surge tank 5 are currently being performed. If the other diagnostic operations are being performed, the ECU 30 proceeds to step 302 for prohibiting the learning and renewing of the learning value DTG. If the other diagnostic operations are not being performed, on the other hand, the ECU 30 proceeds to step 306.

At stop 306, the ECU 30 determines whether the vehicle is currently traveling along a rough road. Determination of whether the vehicle is traveling along a rough road is performed based on values detected by sensors, such as an acceleration sensor (not shown). If the vehicle is traveling along a rough road, the engine speed NE significantly fluctuates. If the learning and renewing of the learning value DTG are performed in this condition, the learning value DTG greatly fluctuates. Therefore, the ECU 30 proceeds to step 302 for prohibiting the learning and renewing of the learning value DTG. If the vehicle is not traveling along a rough road, on the other hand, the ECU 30 proceeds to step 307. At step 307, the ECU 30 judges that the other learning conditions are satisfied and temporarily terminates the subsequent processing.

In the above described routine, the ECU 30 determines whether the other learning conditions are satisfied based on the coolant temperature THW and on whether various testing operations are being performed.

Figure 11:
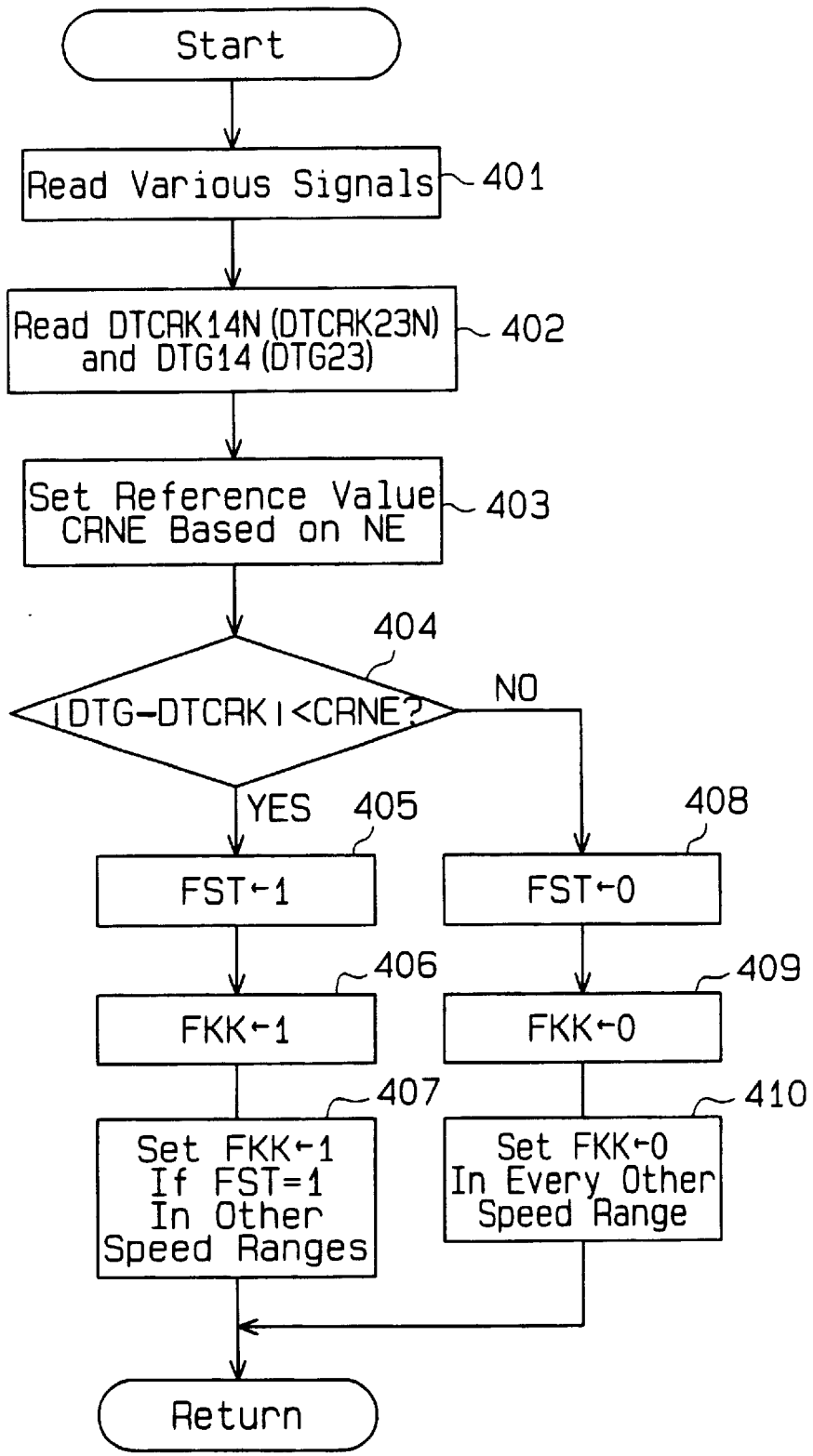
FIG. 11 is a flowchart showing a routine for setting a permitting flag.

The permission flag setting routine will hereafter be described with reference to FIG. 11. This routine is designed for setting the permission flag FKK, which is the subject of the determination in step 111. This routine is an interrupt executed by the ECU 30 at every predetermined crank angle.

When the processing enters this routine, the ECU 30 reads various signals at step 401.

At step 402, the ECU 30 reads the reference rotation fluctuation value DTCRK14N, DTCRK23N computed in the routine of FIG. 3. The ECU 30 also reads the learning values DTG14, DTG23.

At step 403, the ECU 30 sets a reference value CRNE of the engine speed NE. The value CRNE is set smaller for a larger engine speed NE. For example, when the engine speed is equal to or greater than 5200 rpm (NE≧5200 rpm), the reference value CRNE is set to "1 μs", and when the engine speed NE is smaller than 2000 rpm (NE<2000 rpm), the reference value is set to "5 μs".

At step 404, the ECU 30 determines whether the absolute value of the difference between the learning value DTG (DTGI4 or DTG23) and the reference rotation fluctuation value DTCRK (DTCRK14N or DTCRK23N) is smaller than the reference value CRNE. The value DTCRK (DTCRKl4N or DTCRX23N) should have been greatly changed if the timing belt has been replaced. In this case, the absolute value of the difference is greater than the reference value CRNE. If the absolute value of the difference is smaller than the reference value CRNE, the timing belt has not been replaced. In this case, the ECU 30 proceeds to step 405 for performing the misfire detection.

At step 405, the ECU 30 sets a learning value stabilizing flag FST to one and stores the value of the stabilizing flag FST in the RAM 33. The flag FST is set for each engine speed range. The ECU 30 sets the permission flag FKK to one at step 406. At step 407, if the stabilizing flag FST of the current speed range has a value of one, the ECU 30 sets the values of the permission flags FKK of all the other speed ranges to one and temporarily terminates the subsequent processing.

At step 404, if the absolute value of the difference between the learning value DTG and the reference rotation fluctuation value DTCRK is equal to or greater than the reference value CRNE, the ECU 30 judges that the timing belt has been replaced and that the reference rotation fluctuation value DTCRK has been greatly changed. The ECU 30 proceeds to step 408 for prohibiting the misfire detection.

At step 408, the ECU 30 sets the stabilizing flag FST to zero and stores the value of the flag FST in the RAM 33. At step 409, the ECU 30 sets the permission flag FKK to zero. At step 410, the ECU 30 sets the permission flags FKK of all the other speed ranges to zero and temporarily terminates the subsequent processing.

In this manner, the ECU 30 determines whether the absolute value of the difference between the learning value DTG and the reference rotation fluctuation value DTCRK is smaller than the reference value CRNE. If the absolute value is equal to or greater than the value CRNE, the ECU 30 sets the stabilizing value FST and the permission value FKK to zero for prohibiting the misfire detection. If not, the ECU 30 sets the stabilizing value PST end the permission flag FKK to one.

Figure 12:
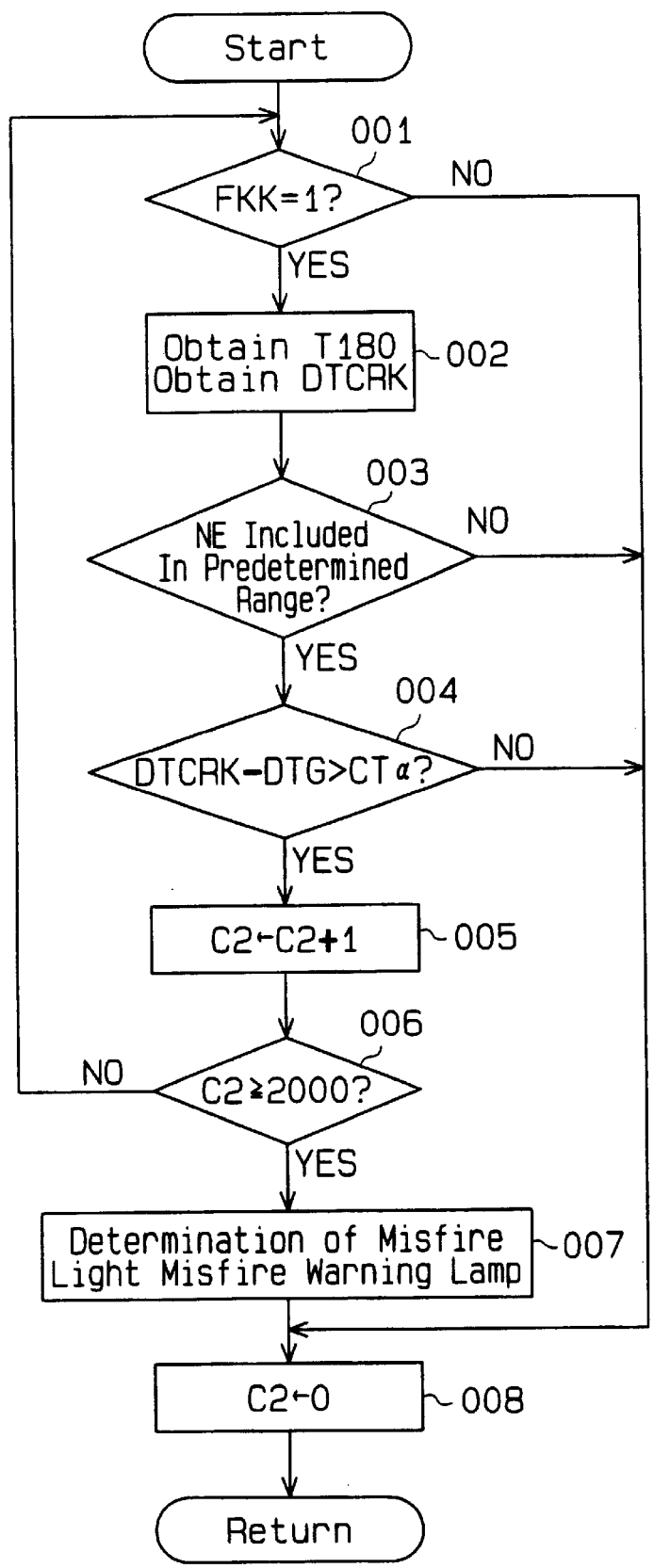
FIG. 12 is a flowchart showing a routine for detecting misfires.

Next, a misfire detection routine will be described with reference to FIG. 12. This routine is performed for each cylinder.

When the processing enters this routine, tho ECU 30 determines whether tho permission flag FKK is one at step 001. If the flag FKK is not one, but zero, the ECU 30 judges that the misfire detection is currently prohibited and proceeds to step 008. At step 008, the ECU 30 resets a counter value C2, which is stored in a counter(not illustrated), to zero and temporarily terminates the subsequent processing.

If the flag FKK is one at step 001, the ECU 30 judges that misfire detection is currently permitted and proceeds to step 002. At stop 002, the ECU 30 computes the time T180 for each cylinder in the same manner as in steps 103 to 110. The ECU 30 also computes a reference rotation fluctuation value DTCRK ( DTCRK14N, DTCRK23N).

At step 003, the ECU 30 determines whether the current engine speed NE is in one of the learning ranged of FIG. 5. If the engine speed NE is out of the ranges, the ECU 30 proceeds to step 008.

If the current engine speed NE is in the range for performing the misfire detection using the learning value DTG, the ECU 30 proceeds to step 004. At step 004, the ECU 30 determines whether the absolute value of the difference between the reference rotation fluctuation value DTCRK (DTCK14N or DTCRK23N) computed in step 002 and the learning value DTG (DTGl4 or DTG23) is greater than a reference value CTα. In this preferred embodiment, the sum of the learning value DTG and the reference value CTα (DTG+CTα) functions as a determination value. The reference value CTα may be zero. If the absolute value of the difference between DTCFK and DTG is equal to or smaller than CTα, the ECU 30 judges that no misfires are taking place and proceeds to stop 008.

If the absolute value is greater than the reference value CTα, the ECU 30 judges that there is a possibility of misfires and proceeds to step 005. At step 005, the ECU 30 increments the counter value C2 by one.

At step 006, the ECU 30 determines whether the counter value C2 has reached a predetermined value (for example, two thousand). If the counter value C2 is equal to or greater than the predetermined values, the ECU 30 proceeds to step 007. If the counter value C2 is smaller than the predetermined value, the ECU repeats the processing of steps 001 to 006 until the counter value C2 reaches the predetermined value.

At step 007, the ECU 30 judges that a misfire has occurred in the cylinder that is currently checked and lights the warning lamp 12. At step 008, the ECU 30 resets the counter value C2 to zero and temporarily terminates the subsequent processing.

In the above described routine, the ECU 30 judges that a misfire has occurred in the cylinder that is currently being checked when the absolute value of the difference between the reference rotation fluctuation value DTCRK (DTCRK14N or DTCRK23N) and the learning value DTG (DTG14 or DTG23) has been greater than the reference value CTα over a predetermined time period.

The advantageous effects of the misfire detection according to the above preferred embodiment will hereafter be described.

A reference load value GN1 is set for the current engine speed NE. When the load value GN is smaller than the reference value GN1, learning and renewing of the learning value DTG are permitted as a rule. Therefore, unlike the prior art, which allows learning and renewing only when a fuel cut-off operation is performed, the preferred embodiment allows learning and renewing of the learning value DTG to be performed over a wide range of the load value GN (GN<GN1); that is, over a wide range of the running state of the engine. Thus, compared to the prior art, learning and renewing of the learning value DTG is by far more frequent. This significantly improves the accuracy of the learning value DTG, which is used for detecting misfires. The accuracy of the misfire detection is thus dramatically improved.

When the throttle opening TA is smaller than the reference value TA1 over the predetermined time period T1, learning and renewing of the learning value DTG are permitted as a rule. This allows learning and renewing over a wide engine speed range, unlike the prior art. When the throttle opening TA is smaller than the reference value TA1, the amount of combustion in the engine 1 has little influence on the speed fluctuation of the crankshaft. Thus, accuracy of the learning value DTG and the misfire detection are improved.

In the above preferred embodiment, the engine speed NE is divided into a plurality of learning ranges, and a learning value DTG is set for each learning range. In other words, the misfire detection is performed using a learning value DTG that corresponds to the current engine speed NE (running condition). This improves the accuracy of the learning value DTG and the misfire detection and enables learning and renewing of DTG at higher engine speed, at which learning and renewing of the learning value is difficult in the prior art. For example, learning is performed even if the engine is raced with the shift lever in the neutral position. Further, in an automatic transmission vehicle, learning is performed even if the throttle valve 8 is fully closed immediately after a vehicle is accelerated by a wide open throttle (WOT) operation with the shift lever in the driving position.

The learning ranges are set narrower than the divided engine speed ranges. In other words learning prohibiting ranges are provided between each pair of adjacent learning ranges. This reduces variations of learning values DTG caused by changes in the engine speed NE within one of the learning speed ranges. The accuracy of the misfire detection is thus further improved.

In the above preferred embodiment, a learning value DTG is set for each cylinder group. A common learning value DTG is set for the cylinders 1 and #4, and another common learning value DTG is set for the cylinders #2 and #3. This is because the rotor speed during a time T180 is substantially the same for pistons belonging to the same group. Setting a common learning value DTG for a cylinder group simplifies computations in the routines and reduces the number of executions of the computations. This simplifies the programs and reduces the cost.

The rotation fluctuation values DTCRK14 and DTCRK23, each corresponding to a cylinder group, are accumulated, respectively, and the average of DTCRK14 and DTCRK23 is computed. A learning value DTG in net based on DTRCK14 and DTCRK23. Therefor, even if the rotation fluctuation value DTCRK between the cylinder groups varies, the effect of the variation is reduced by using an average. This improves the accuracy of the obtained learning value DTG and the accuracy of the misfire detection.

When obtaining a learning value DTG, the DTG is adjusted in accordance not only with the teeth displacement of the rotor, or torsion of the crankshaft 13, but also with a delay of T180 caused by deceleration of the vehicle. The 5 adjustment is carried out at steps 109 to 114 in the routine of FIG. 3. This further improves the accuracy of the obtained leaning value DTG thereby improving the accuracy of the misfire detection.

When the permission flag FKK is one, the learning value DTG (DTGl4 or DTG23) of the current speed range is abated. When the flag FKK is zero, the ECU 30 judges that the rotation fluctuation value DTCRK has been significantly changed due to a replacement of the timing belt and fundamentally renews the learning value DTG (DTG14 or DTG23) of the current engine speed range. Therefore, if the timing belt has been replaced, the learning value DTG is stabilized at an early stage. This shortens the period during which the value DTG has low reliability.

Further, when the permission flag FXX of the current engine speed range is one, the flags FKK of all speed ranges at which the stabilizing flag FST is one are set to one. This permits the misfire detection to be performed in the current engine speed range when a learning value DTG is learned and renewed for the first time after the engine 1 is started. Therefore, when the engine 1 is started, misfire detection is performed at an earlier stage over a wide range of the engine speed NE.

When the permission flag FKK is set to zero in the current engine speed range, the flags FKK of the other speed ranges are also set to zero. Therefore, when the tension of the timing belt is changed, for example, due to replacement of the timing belt, and the rotation fluctuation value DTCRK is greatly changed, the learning values DTG obtained before the replacement are not used further. Thus, after replacement of the timing belt, erroneous misfire detection results are prevented.

When the coolant temperature TRW is low, and various function tests that might subtly affect the negative pressure in the surge tank 5 are being performed, renewing of the leaning value DTG is prohibited. This improves the reliability of the learning value DTG thereby improving the accuracy of the misfire detection.

A second embodiment of the present invention will hereafter be described with reference to drawings 13 and 14.

Figure 13:
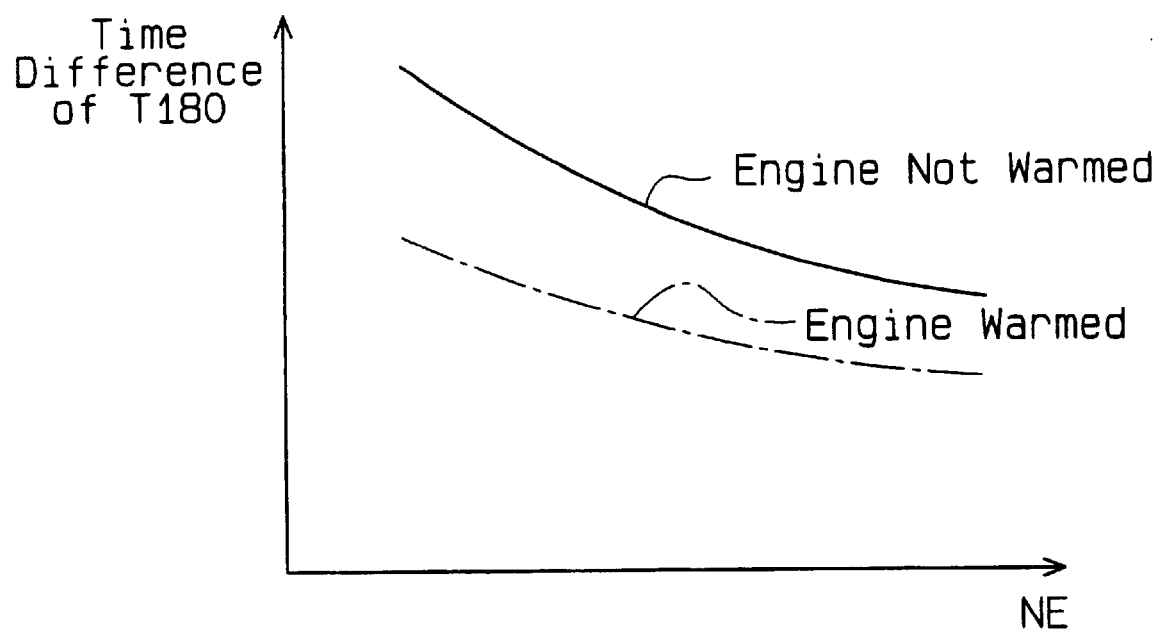
FIG. 13 is a graph showing the relationship between the engine speed and the time difference of time T180 when the engine is not warmed and when the engine is warmed in a second embodiment.
Figure 14:
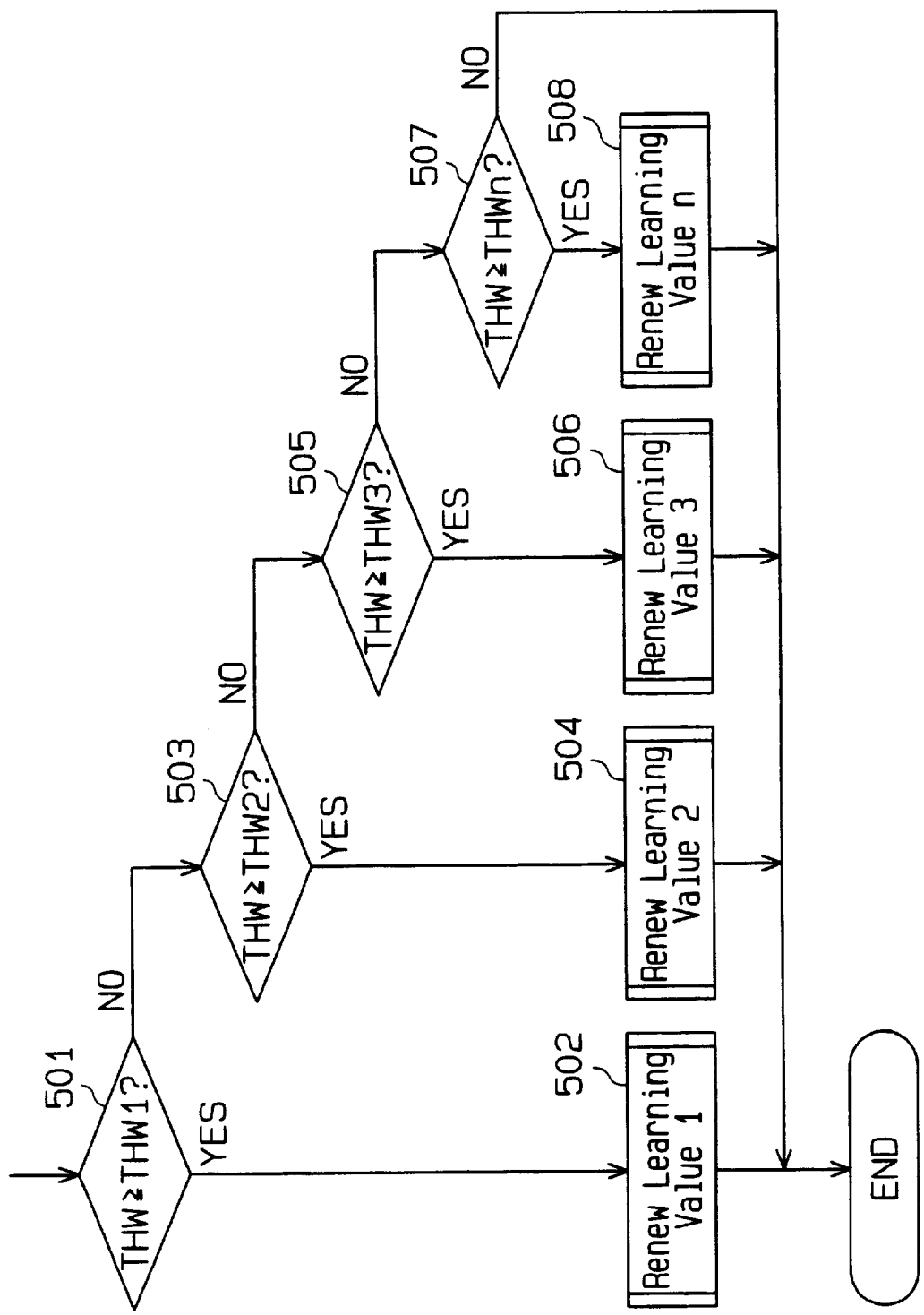
FIG. 14 is a flowchart showing a routing for renewing a learning value at different coolant temperatures.

In the first embodiment, learning of DTG is prohibited when the coolant temperature THW is lower than the predetermined temperature THWα. This is because T180, during which the crankshaft 13 turns 180° CA, is different when the engine 1 is cold from when the engine 1 is warmed as illustrated in FIG. 13. However, in the second embodiment, the learning value is adjusted according to the coolant temperature THW. FIG. 14 is a flowchart showing processing steps for adjusting the learning value according to the coolant temperature THW.

As described in FIG. 14, the coolant temperature is divided into first to nth ranges. At step 501, the ECU 30 judges whether the coolant temperature THW is equal to or higher than a first coolant temperature THW1. If the determination is satisfied, the ECU 30 proceeds to step 502 and renews the learning value, or replaces the learning value with a learning value 1.

If coolant temperature THW is lower than the first temperature THW1, the ECU 30 proceeds to step 503. At step 503, the ECU 30 judges whether the coolant temperature THW is equal to or higher than a second coolant temperature THW2. If the determination is satisfied, the ECU 30 proceeds to step 504 and renews the learning value, or replaces the learning value with a learning value 2.

If coolant temperature THW is lower than the second temperature THW2, the ECU 30 proceeds to step 505. At step 505, the ECU 30 judges whether the coolant temperature THW is equal to or higher than a third coolant temperature THW3. If the determination is satisfied, the ECU 30 proceeds to step 506 and renews the learning value, or replaces the learning value with a learning value 3.

After repeating the above proceeding, the ECU 30 determines whether the coolant temperature THW is equal to or higher than an nth temperature THWn. If the determination is satisfied, the ECU 30 proceeds to step 508. At step 508, the ECU 30 renews the learning value, or replaces the learning value with a learning value n. If the determination is not satisfied, the ECU 30 does not renew the learning value.

As described above, the processing of the second embodiment allows the learning value to be adjusted in accordance with the coolant temperature THW. This improves the misfire detection.

A third embodiment of the present invention will hereafter be described with reference to FIG. 15.

In the first preferred embodiment, when the permission flag FKK is one in the routine of FIG. 3, the learning value DTG (DTG14 or DTG23) is abated. When the permission flag FKK is zero, the learning value DTG (DTGl4 or DTG23) is fundamentally renewed. However, in this third embodiment, the learning value DTG is abated even if the permission flag FKK is zero. In this case, the abatement is preferably milder at step 112 of FIG. 13.

Figure 15:
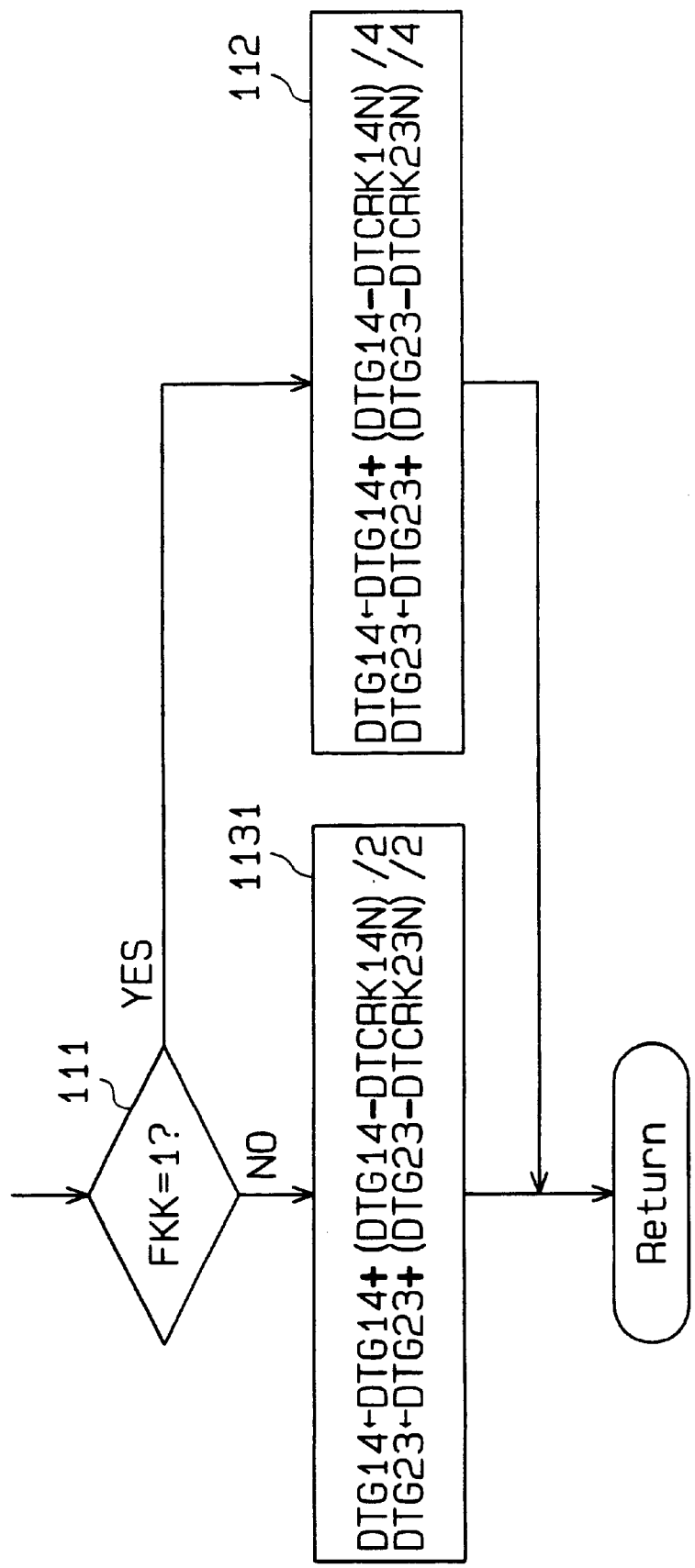
FIG. 15 is a flowchart showing a part of a routine for setting a learning value in a third embodiment.

As shown in FIG. 15, if the permission flag FKK is zero at step 111, the, ECU 30 proceeds to step 1131. At step 1131, when the cylinder #1 or the cylinder #4 is currently selected, the ECU 30 sets the learning value DTG14. Specifically, the ECU 30 subtracts the reference rotation fluctuation value DTCRK14N from the learning value DTG14 obtained in the previous routine and divides the computed value by two. The ECU 30 renews the learning value DTC14 by adding the resultant value to the learning value DTG14 of the previous routine. Similarly, when the cylinder #2 or the cylinder #3 is selected, the ECU 30 sets the learning value DTC23. Specifically, the ECU 30 subtracts the reference rotation fluctuation value DTCRK23N from the learning value DTG23 obtained in the previous routine and divides the computed value by two. The ECU 30 renews the learning value DTG23 by adding the resultant value to the learning value DTG23 of the previous routine.

When the rotation fluctuation value DTCRK is greatly changed due to a replacement of the timing belt, a fundamental renewal of the learning value DTG (DTG14 or DTG23) is not necessary. Instead, changing the degree of abating offers substantially the same effects as the preceding embodiments.

A fourth embodiment of the present invention will hereafter be described with reference to FIGS. 16 and 17.

In the routine of FIG. 3 in the first embodiment, the reference rotation fluctuation value DTCRK14N is computed by subtracting the average DTCRKAV of the current rotation fluctuation value DTCRK14 and the fluctuation value DTCRK23 of the previous routine from the current rotation fluctuation value DTCRK14. The reference rotation fluctuation value DTCRK23N of tho cylinders #2, #3 is computed in the same manner.

Figure 16:
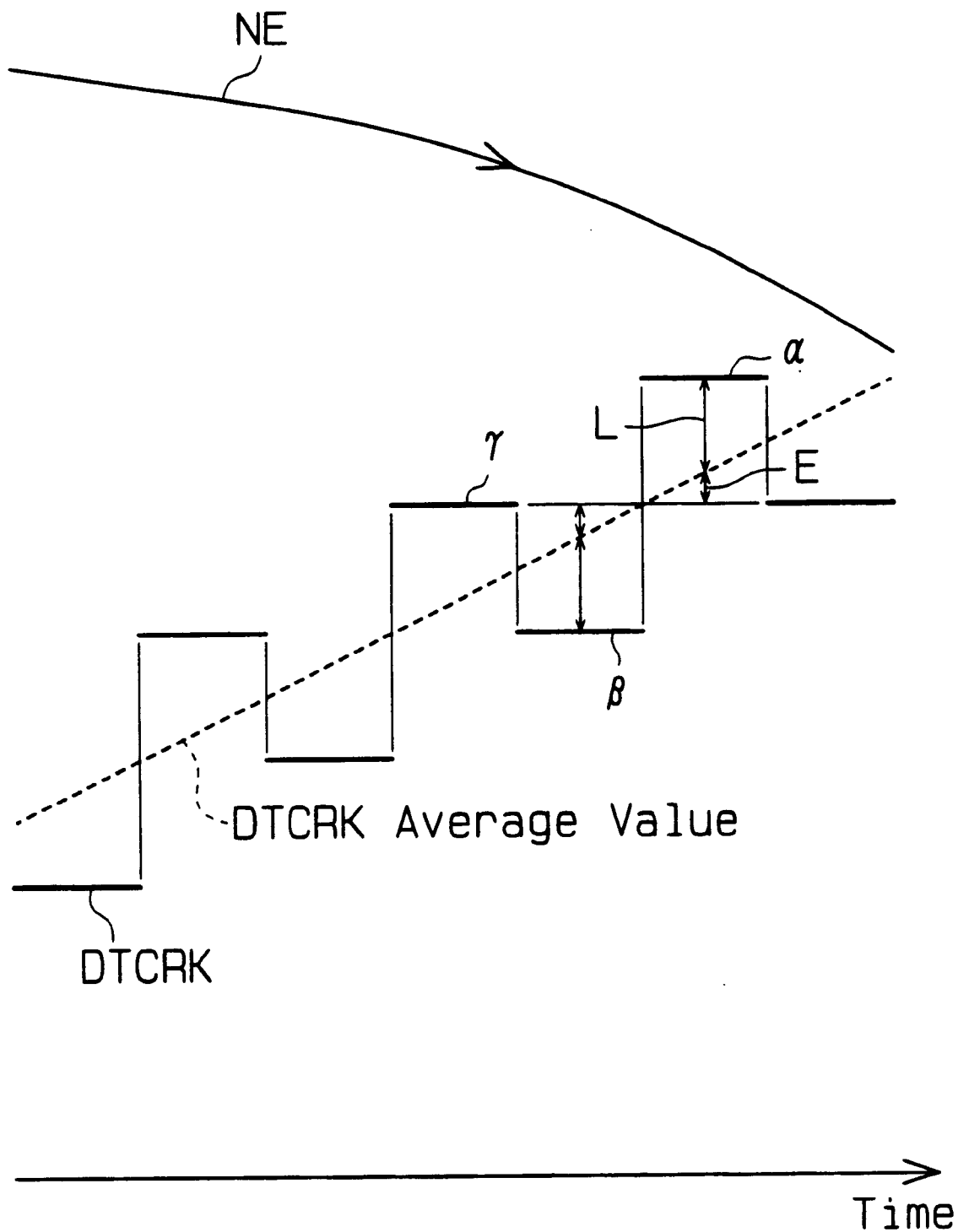
FIG. 16 is a timing chart showing rotation speed fluctuation of a crankshaft and behavior of the average rotation speed of the crankshaft when the engine speed is abruptly decreased according to a fourth embodiment.
Figure 17:
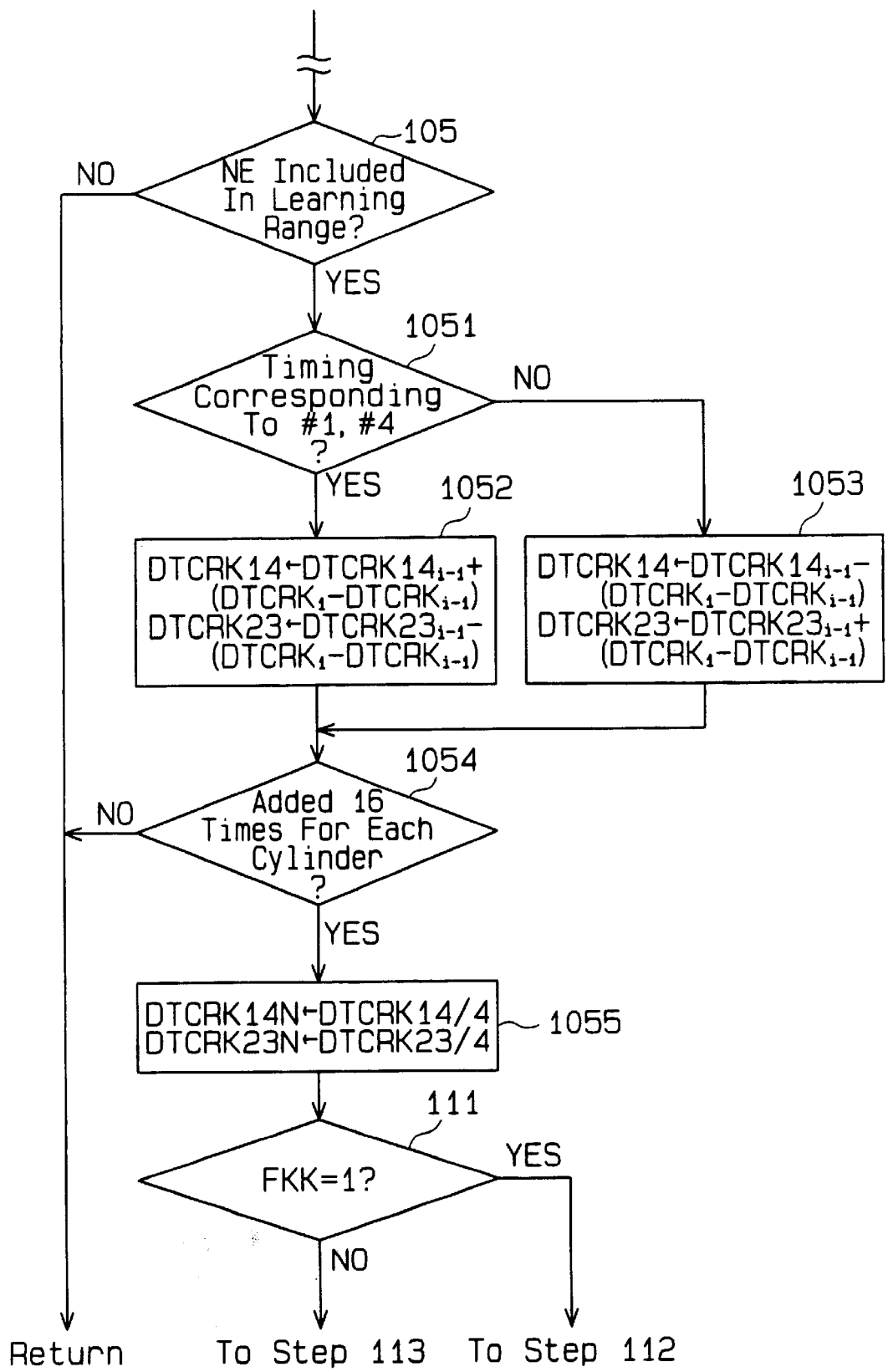
FIG. 17 is a flowchart showing a part of a routine for setting a learning value in a fourth embodiment.

However, when the engine speed NE drops rapidly as illustrated in FIG. 16, the average value of the rotation fluctuation value DTCRK is changed significantly. In this case, the above described method for computing values DTCRK14N, DTCRK23N creates an error, which is indicated by the letter E in FIG. 16. Suppose the value DTCRK14 of the current routine is $\alpha$, and the value DTCRK23 of the previous routine is $\beta$. According to the method of the first embodiment, the reference value DTCRK14N is computed by an expression "$\alpha-(\alpha+\beta)/2$". If the average value of the value DTCRK increases at a constant rate, the value of the expression "$\alpha-(\alpha+\beta)/2$" is equal to the sum of parts L and E (L+E) in FIG. 16. However, the actual value of DTCRK14N should be a value that is equal to the part L in FIG. 16.

As described above, when reference rotation fluctuation values DTCRK14N, DTCRK23N are computed, a sudden drop of the engine speed NE greatly changes the average value of the rotation fluctuation value DTCRK. However, in such a case, the fourth embodiment minimizes the value of the error caused by the changing of the average value.

Suppose that the rotation fluctuation value DTCRK14 in the current routine is $\alpha$, the rotation fluctuation value DTCRX23 of the previous routine is $\beta$, and the rotation fluctuation value DTCRK14 of two routines earlier is $\gamma$. In this case, the reference fluctuation value DTCRXl4N is computed by an expression "$\{(\alpha-\beta)-(\beta-\gamma)\}/4$" in this embodiment. The value of DTCRK14N is preferably equal to the part indicated by a letter L in FIG. 1G. If the average value of the fluctuation value DTCRK changes at a constant rate, the value DTCRK14N computed by the expression "$\{(\alpha-\beta)-(\beta-\gamma)\}/4$" becomes equal to the part L.

The processing that uses the above computation will now be described referring to the flowchart of rig. 17. In this routine, steps that are the same as step 101 to 105 (see FIG. 3) according to the first embodiment are performed. At step 105, if the engine speed NE is in a predetermined learning range, the ECU proceeds to step 1051.

At step 1051, the ECU 30 determines whether the currently selected cylinder (a cylinder at ignition) is one of the cylinders #1 and #4. If the selected cylinder is the cylinder #1 or #4, the ECU 30 proceeds to step 1052. At step 1052, the ECU 30 computes a new rotation fluctuation value DTCRK14, DTCRK23 based on the equations (1), (2) below. In the following equations, DTCRK14$_{i-1}$ is the rotation fluctuation value DTCRK14 of the cylinders #1 and #4 computed at step 1053 in the previous routine. Similarly, DTCRK23$_{i-1}$ is the rotation fluctuation value DTCRK23 of the cylinders #2 and #3 computed at step 1053 in the previous routine. If the currently selected cylinder is the cylinder #1, the rotation fluctuation value of the cylinder #2 is subtracted from the rotation fluctuation value of the cylinder #1 in the following equations (1) and (2).

$$\text{DTCRK14} = \text{DTCRK14}_{i-1} + (\text{DTCRK}_i - \text{DTCRK}_{i-1}) \qquad (1)$$

$$\text{DTCRK23} = \text{DTCRK23}_{i-1} + (\text{DTCRK}_1 - \text{DTCRK}_{i-1}) \qquad (2)$$

If it is determined that the currently selected cylinder is not one of the cylinders #1 and #4 at step 1051, the ECU 30 judges that the currently collected cylinder is one of the cylinders #2 and #3 and proceeds to step 1053. At step 1053, the ECU 30 computes new rotation fluctuation values DTCRK14 and DTCRK23 based on the following equations (3) and (4).

$$\text{DTCRK14} = \text{DTCRK14}_{i-1} - (\text{DTCRK}_i - \text{DTCRX}_{i-1}) \qquad (3)$$

$$\text{DTCRK23} = \text{DTCRK23}_{i-1} - (\text{DTCRK}_1 - \text{DTCRK}_{i-1}) \qquad (4)$$

The equations (3) and (4) correspond to the above expression "$\{(\alpha-\beta)-(\beta-\gamma)\}$"

The ECU 30 proceeds to step 1052 from either step 1052 or step 1053. At step 1054, the ECU 30 determines whether the rotation fluctuation value DTCRK of each cylinder has been accumulated sixteen times. If the determination is not satisfied, the ECU 30 temporarily terminating the subsequent processing. If the determination is satisfied the ECU 30 proceeds to step 1055.

At step 1055, the ECU 30 computes a reference rotation fluctuation value DTCRK14N by dividing the rotation fluctuation value DTCRK14 by four. Also, the ECU 30 computes a reference rotation fluctuation value DTCRK23N by dividing the rotation fluctuation value DTCRK23 by four.

Then, the ECU 30 proceeds to stop 111 as in the first embodiment and executes the subsequent processing.

As described above, the reference rotation fluctuation values DTCRK14N, DTCRK23N are computed based on the expression "$\{(\alpha-\beta)-(\beta-\gamma)\}/4$". Therefore, even it the engine speed NE abruptly drops and the average value of the rotation fluctuation value DTCRK changes drastically, the error is minimized. Particularly, if the average value of DTCRK changes at a constant rate, the error becomes substantially zero. This results in improved accuracy of the learning value DTG, which is used for detecting misfires. Accordingly, the accuracy of the misfire detection is improved.

A fifth embodiment of the present invention will hereafter be described with reference to FIGS. 18 and 19.

The fourth embodiment minimizes an error component in the reference rotation fluctuation values DTCRK14N, DTCRK23N when the average value of rotation fluctuation value DTCRK is greatly changed. However, when the rate of change in the average value of DTCRK changes drastically, that is, when the average value of DTCRK changes at an significantly unstable rate, it is difficult to eliminate error components from the values DTCRK14N, DTCRK23N.

In this embodiment, learning of the learning value DTG is prohibited when the average value of DTCRK fluctuates in an extreme manner. As shown in FIG. 18, a rotation fluctuation value DTCRK of a selected cylinder is computed by subtracting the time T1$_{i-1}$ of the previous cylinder (a cylinder at which combustion took place immediately before the selected cylinder) from the time T180$_i$ of the selected cylinder. The difference between the value DTCRK$_i$ of the currently selected cylinder and a value DTCRK$_{i-2}$, which is calculated 360° CA before DTCRK$_i$ is computed, and the resultant value is defined as a single-differentiated value DDTCR (DDTCR=DTCRK$_i$−DTCRK$_{i-2}$). The value DDTCR eliminates the effect of the tolerance of the rotor. Then, the difference between the single-differentiated value DDTCR$_i$ of the currently selected cylinder and the single-differentiated value DDTCR$_i$ of the previous cylinder is computed, and the resultant value is defined as a double-differentiated value DDDTC (DDTC=DDTCR$_i$−DDTCR$_{i-1}$).

Figure 18:
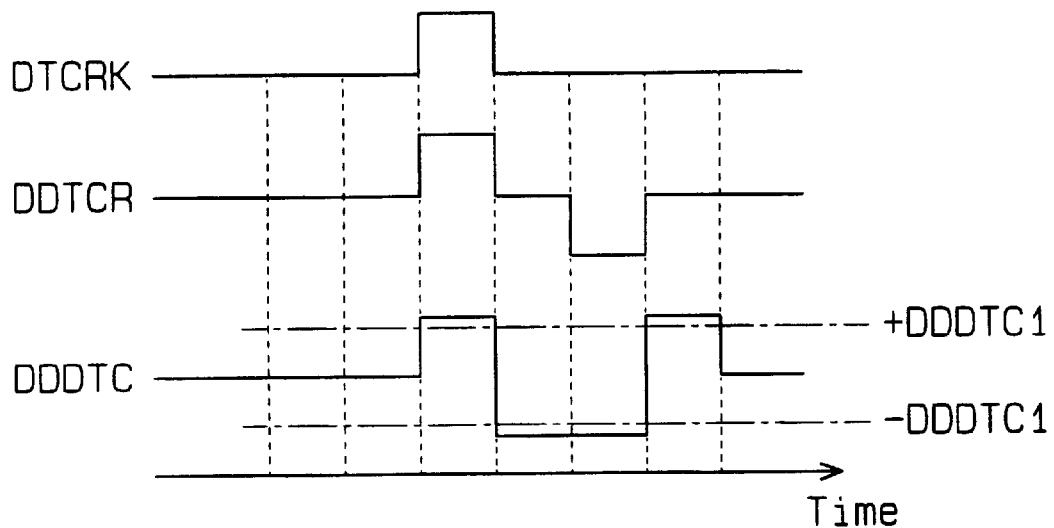
FIG. 18 is a timing chart showing the behaviors of rotation fluctuation, single-differentiated value and double-differentiated value in a fifth embodiment.

When the double-differentiated value DDDTC is out of a predetermined range as illustrated in FIG. 18, learning of the learning value DTG is prohibited. More specifically, the learning of DTG is prohibited when the absolute value of DDDTC is greater than a predetermined value DDDTC1.

Figure 19:
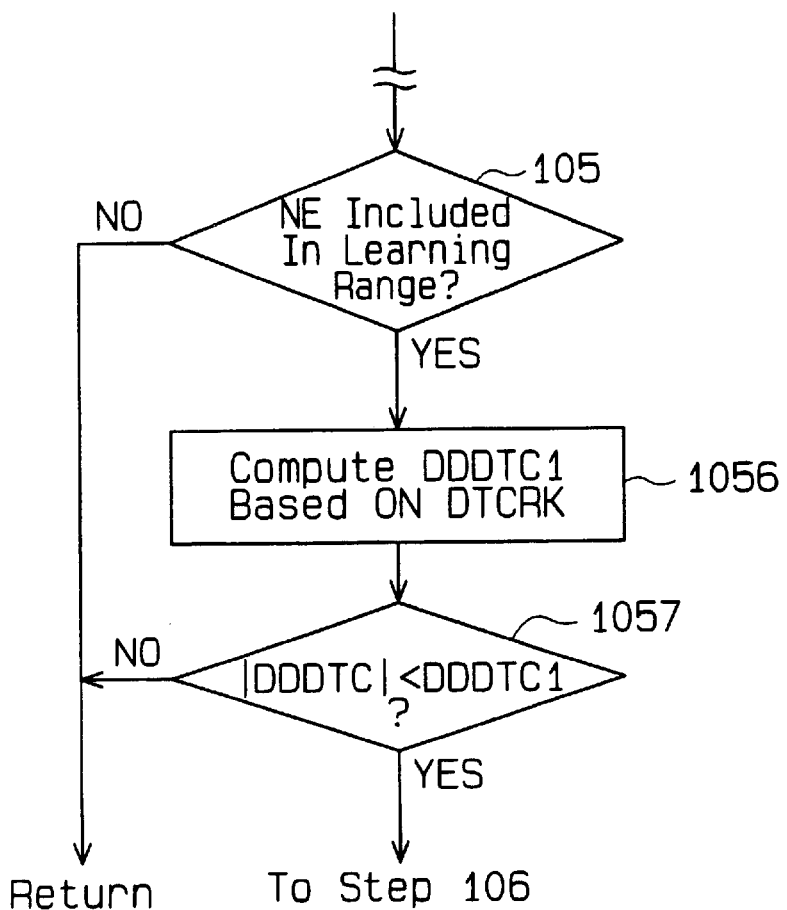
FIG. 19 is a flowchart showing a part of a routine for setting a learning value in the fifth embodiment.

The above processing is described referring to a flowchart of FIG. 19. The ECU 30 executes the processing of steps 101 to 105 (see FIG. 3) as in the learning value setting routine of the first embodiment. If the engine speed NE is in a predetermined learning range, tho ECU 30 proceeds to step 1056.

At step 1056, the ECU 30 computes a double-differentiated value DDDTC based on the above described computing method. That is, the ECU 30 computes the single-differentiated value DDTCR based on the rotation fluctuation value DTCRK and then computes the double-differentiated value DDDTC based on the single differentiated value DDTCR.

At step 1057, the ECU 30 determines whether the absolute value of the double-differentiated value DDDTC is smaller than a predetermined value DDDTC1. If the determination is satisfied, the ECU 30 proceeds to step 106 (see FIG. 3) for permitting learning and renewing of the learning value DTG and executes the subsequent processing.

If the determination is not satisfied at step 1057, the ECU 30 judges that the rate of change in the rotation fluctuation value DTCRK is fluctuating in an extreme manner and that it is difficult to eliminate the error component caused by the fluctuation of the rate of change in DTCRK. The ECU 30 then temporarily terminates the subsequent processing.

As described above, learning of the learning value DTG is prohibited when the rate of change in the rotation fluctuation value DTCRK fluctuates in an extreme manner. This eliminates error components generated by the fluctuation of the average value of the rotation fluctuation value DTCRK when setting and renewing the learning value DTG. This improves the accuracy of the learning value DTG thereby dramatically Improving the accuracy of the misfire detection.

Although only five embodiments of the present invention have been described herein, it should be apparent to those skilled in the art that the present invention may be embodied in many other specific forms without departing from the spirit or scope of the invention. Particularly, it should be understood that the invention may be embodied in the following forms.

(1) The present invention may be adopted to engines other than the in-line four cylinder type engine 1. For example, the present invention may be embodied in a six-cylinder V-type engine, an eight cylinder type engine and an in-line six cylinder type engine.

(2) When downshifting an automatic transmission vehicle, a high engine speed NE may disturb the learning value DTG. In this case, the learning may be prohibited. Specifically, a step for prohibiting the learning under such a condition may be added after step 306. Further, the learning may be prohibited when the voltage of the battery is low or when a starting switch of an air conditioner is turned on and off. These prohibitions of learning improve the reliability of the learning value DTG thereby improving the accuracy of the misfire detection.

(3) The learning may be permitted only when the engine speed NE is gradually lowering and may be prohibited when the engine speed NE is increasing. Further, the learning may be prohibited when the engine speed NE is lowering in a fluctuating manner. Processing of these prohibitions may be added after step 306. When the engine speed NE is quickly increasing or decreasing, a large load acts on the engine. This prevents an accurate detection of the rotation fluctuation value. Therefore, prohibiting learning of the learning value in such conditions improves the accuracy of rotation fluctuation values and the accuracy of learning values.

(4) In the above embodiments, the possibility of a misfire is detected when a value obtained by subtracting the learning value DTG from the reference rotation fluctuation value DTCRK is greater than the predetermined reference value $CT\alpha$ (determination value). Alternatively, the reference value $CT\alpha$ may be learned and renewed.

Therefore, the present examples and embodiments are to be considered as illustrative and not restrictive and the invention is not to be limited to the details given herein, but may be modified within the scope and equivalence of the appended claims.

What is claimed is:

1. An apparatus for detecting misfires in an internal combustion engine of a vehicle, the apparatus comprising:
   a plurality of cylinders defined in the engine;
   a piston accommodated in each cylinder to reciprocate in the cylinder;
   a shaft connected with the pistons, the shaft being rotated by reciprocal movement of the pistons;
   a speed sensor for detecting the rotating speed of the shaft;
   a deviation computer for computing a deviation between earlier and later times of the rotating speed of the shaft at a selected portion of a cycle of a selected piston based on the detected speed of the shaft, wherein the deviation is affected by the load on the engine;
   setting means for setting a learning value based on the computed deviation, wherein the learning value is a reference value used for detecting misfires in the cylinders;
   a memory for storing the learning value;
   a condition sensor for detecting a running condition of the engine, wherein the condition is indicative of the load of the engine;
   learning means for renewing the learning value stored in the memory based on the detected condition of the engine;
   a first determiner for determining whether a misfire has occurred in each cylinder based on a difference between the computed deviation and the learning value; and
   means for permitting the renewing of the learning value by the learning means only when the engine load is less than a predetermined value that is determined by the rotating seed of the shaft.

2. The apparatus according to claim 1, wherein the first determiner determines that a misfire has occurred when a difference between the deviation of a particular cylinder and the learning value is greater than a predetermined reference value.

3. The apparatus according to claim 1, further comprising an averager for computing an average deviation, and wherein the setting means sets the learning value based on the average deviation.

4. The apparatus according to claim 3, wherein the setting means modifies the learning value by reducing the influence of a change of vehicle speed on the the learning value.

5. The apparatus according to claim 1, wherein there are cylinder groups among the cylinders, wherein the cylinders of a group have characteristics in common, and the learning value is set for each groups.

6. The apparatus according to claim 5, wherein the engine has four cylinders forming two groups, and the setting means sets two learning values, one for each group.

7. The apparatus according to claim 1, wherein the engine is cooled by coolant, wherein the temperature of the coolant is divided into a plurality of ranges, and wherein the learning value is set for each temperature range.

8. The apparatus according to claim 1, further comprising an intake passage connected to the cylinders, and a throttle valve positioned in the intake passage for adjusting the amount of air flow through the intake passage, wherein the means for permitting permits the renewing of the learning value when the opening amount of the throttle valve is less than a predetermined amount.

9. The apparatus according to claim 8, wherein the means for permitting permits the renewal of the learning value after the opening of the throttle valve is reduced to less than a predetermined amount.

10. The apparatus according to claim 8, wherein the means for permitting permits the renewal of the learning value after a predetermined time period elapses from when the opening of the throttle valve is reduced to a predetermined amount.

11. The apparatus according to claim 1, wherein the shaft has a range of rotating speeds, and the range of rotating speeds of the shaft is divided into a plurality of sub-ranges, and wherein the learning value is set for each speed sub-range.

12. The apparatus according to claim 11, wherein each speed sub-range includes a learning range within which the renewing of the learning value is permitted and a prohibiting range in which the renewing of the learning value is prohibited, each learning range being narrower than the speed sub-range within which it is included.

13. The apparatus according to claim 11, further comprising prohibiting means for prohibiting of the renewing the learning value, and wherein the learning value has an initial value, and wherein when a renewed learning value in one speed range is changed rapidly from a previous learning value, the learning means sets the learning value to the initial value in every other speed range, and wherein the prohibiting means prohibits the renewal of the learning value in all the speed ranges.

14. The apparatus according to claim 11, wherein the permitting means allows the first determiner to determine whether misfires have occurred in the speed range to which the renewed learning value belongs when an initial renewed learning value is substantially equal to the most recent learning value.

15. The apparatus according to claim 14, further comprising a second determiner for determining whether the renewed learning value is stabilizing, wherein the second determiner determines that the learning value is stabilizing when the new learning value is substantially equal to the most recent learning value, and wherein the permitting means allows the renewal of the learning value in one speed range when the learning value in another speed range is determined by the second determiner to be stablizing.

16. The apparatus according to claim 1, wherein the learning means renews the learning value based on the most recent learning value and a previous learning value, and wherein the renewed learning value is a function of the most recent learning value and the previous learning value.

17. The apparatus according to claim 16, wherein the function is changed when the current learning value is drastically changed from the previous learning value.

18. The apparatus according to claim 17, wherein the most recent learning value is set as a new learning value when the most recent learning value in drastically changed from the previous learning value.

19. The apparatus according to claim 1, wherein the permitting means allows the renewal the learning value when the rotating speed of the shaft is decreasing gradually.

20. The apparatus according to claim 1, further comprising a second determiner for determining whether the renewed learning value is stabilizing, and wherein the first determiner functions when the learning value is determined to be stabilizing.

21. The apparatus according to claim 1, wherein the learning means computes a first difference between a current deviation and a previous deviation, and the learning means computes a second difference between the previous deviation and a further previous deviation, and the learning means subtracts the second difference from the first difference, and the learning means accumulates the subtracted value a plurality of times.

22. The apparatus according to claim 1, further comprising a differential computer for computing a double differentiated value concerning time, and wherein the allowing means allows the renewal of the learning value when the double differentiated value is within a predetermined range.

23. A method for detecting misfires in an internal combustion engine, the engine having a plurality of cylinders defined in the engine, a piston accommodated in each cylinder to reciprocate in the cylinder, and a shaft connected with each piston, the shaft being rotated by the reciprocal movement of each piston, the method comprising:

detecting the rotating speed of the shaft;

computing a deviation between an earlier time and a later time of the rotating speed of the shaft for a selected portion of a cycle of a selected cylinder based on the detected speed of the shaft;

setting a learning value based on the computed deviation, wherein the learning value is used for detecting the misfires in the engine;

storing the learning value in a memory;

detecting a running condition of the engine, wherein the running condition is indicative of the load on the engine;

renewing the learning value stored in the memory based on the detected condition of the engine;

determining whether a misfire has occurred in the selected cylinder based on a difference between the deviation and the learning value; and permitting the renewing of the learning value by the learning means only when the engine load is less than a predetermined value that is determined by the rotating speed of the shaft.

24. The method of claim 23, including determining that a misfire has occurred when the difference between the deviation of the selected cylinder and the learning value is greater than a predetermined reference value.

25. The method of claim 23, including the step of averaging the deviation of all the cylinders and basing the learning value on the average.

26. The method of claim 23, wherein the plurality of cylinders include groups of cylinders having common characteristics, wherein the step of setting a learning value includes setting a learning value for each group of cylinders.

27. The method of claim 23, wherein the engine is cooled by coolant, and wherein the method includes the step of dividing the temperature range of the coolant into a plurality of sub-ranges, and wherein the step of setting a learning value includes setting a learning value for each sub-range.

28. The method of claim 23, wherein the step of permitting the learning includes the step of permitting the learning only when the opening of the throttle valve is less than a predetermined amount.

29. The method of claim 28, wherein renewal of learning is permitted only after a predetermined time period has elapsed from when an opening of a throttle valve of the engine is reduced to a predetermined amount.

30. The method according to claim 23, wherein the rotating shaft has a range of rotating speeds, and the range of speeds is divided into a plurality of speed sub-ranges, and wherein a learning value is set for each sub-range.

31. The apparatus according to claim 30, wherein each speed sub-range includes a learning range within which the renewing of the learning value is permitted and a prohibiting range in which the renewing of the learning value is prohibited, each learning range being narrower than the speed sub-range within which it is included.

32. An apparatus for detecting misfires in an internal combustion engine of a vehicle, the apparatus comprising:

a plurality of cylinders defined in the engine;

a piston accommodated in each cylinder to reciprocate in the cylinder;

a shaft connected with the pistons, the shaft being rotated by reciprocal movement of the pistons;

a speed sensor for detecting the rotating speed of the shaft;

a deviation computer for computing a deviation between earlier and later times of the rotating speed of the shaft at a selected portion of a cycle of a selected piston based on the detected speed of the shaft;

setting means for setting a learning value based on the computed deviation, wherein the learning value is a reference value used for detecting misfires in the cylinders, the learning value being set while the engine is under load and during fuel combustion;

a memory for storing the learning value; and a first determiner for determining whether a misfire has occurred in the cylinder with the selected piston based on a difference between the computed deviation and the learning value, wherein the engine is cooled by coolant, coolant temperature is divided into a plurality of temperature ranges, and the learning value is set for each temperature range.

33. An apparatus for detecting misfires in an internal combustion engine of a vehicle, the apparatus comprising:
a plurality of cylinders defined in the engine;
a piston accommodated in each cylinder to reciprocate in the cylinder;
a shaft connected with the pistons, the shaft being rotated by reciprocal movement of the pistons and having a range of rotating speeds, the range of rotating speeds being divided into a plurality of sub-ranges;
a speed sensor for detecting the rotating speed of the shaft;
a deviation computer for computing a deviation between earlier and later times of the rotating speed of the shaft at a selected portion of a cycle of a selected piston based on the detected speed of the shaft;
setting means for setting a learning value based on the computed deviation, wherein the learning value is a reference value used for detecting misfires in the cylinders, the learning value being set while the engine is under load and during fuel combustion;
a memory for storing the learning value; and
a first determiner for determining whether a misfire has occurred in the cylinder with the selected piston based on a difference between the computed deviation and the learning value,
wherein the learning value is set for each sub-range, with each sub-range including a learning range within which the renewing of the learning value is permitted and a prohibiting range in which the renewing of the learning value is prohibited, each learning range being narrower than the speed sub-range within which it is included.

34. An apparatus for detecting misfires in an internal combustion engine of a vehicle, the apparatus comprising:
a plurality of cylinders defined in the engine;
a piston accommodated in each cylinder to reciprocate in the cylinder;
a shaft connected with the pistons, the shaft being rotated by reciprocal movement of the pistons and having a range of rotating speeds, the range of rotating speeds being divided into a plurality of sub-ranges;
a speed sensor for detecting the rotating speed of the shaft;
a deviation computer for computing a deviation between earlier and later times of the rotating speed of the shaft at a selected portion of a cycle of a selected piston based on the detected speed of the shaft;
setting means for setting a learning value based on the computed deviation, wherein the learning value is a reference value used for detecting misfires in the cylinders;
a memory for storing the learning value;
a condition sensor for detecting a running condition of the engine, wherein the condition is indicative of the load of the engine;
learning means for renewing the learning value stored in the memory based on the detected condition of the engine;
a first determiner for determining whether a misfire has occurred in the cylinder with the selected piston based on a difference between the computed deviation and the learning value; and
prohibiting means for prohibiting the renewing of the learning value,
wherein the learning value has an initial value and is set for each sub-range, and when a renewed learning value in one speed range is changed rapidly from a previous learning value, the learning means sets the learning value to the initial value in every other speed range and the prohibiting means prohibits the renewal of the learning value in all of the speed ranges.

35. An apparatus for detecting misfires in an internal combustion engine of a vehicle, the apparatus comprising:
a plurality of cylinders defined in the engine;
a piston accommodated in each cylinder to reciprocate in the cylinder;
a shaft connected with the pistons, the shaft being rotated by reciprocal movement of the pistons and having a range of rotating speeds, the range of rotating speeds being divided into a plurality of sub-ranges;
a speed sensor for detecting the rotating speed of the shaft;
a deviation computer for computing a deviation between earlier and later times of the rotating speed of the shaft at a selected portion of a cycle of a selected piston based on the detected speed of the shaft;
setting means for setting a learning value based on the computed deviation, wherein the learning value is a reference value used for detecting misfires in the cylinders;
a memory for storing the learning value;
a condition sensor for detecting a running condition of the engine, wherein the condition is indicative of the load of the engine;
learning means for renewing the learning value stored in the memory based on the detected condition of the engine;
a first determiner for determining whether a misfire has occurred in the cylinder with the selected piston based on a difference between the computed deviation and the learning value; and
means for permitting the renewing of the learning value by the learning means only when the engine load is less than a predetermined value,
wherein the learning value is set for each sub-range and the permitting means allows the first determiner to determine whether misfires have occurred in the speed range to which the renewed learning value belongs when an initial renewed learning value is substantially equal to the most recent learning value.

36. The apparatus according to claim 35, further comprising a second determiner for determining whether the renewed learning value is stabilizing, the second determiner determining that the learning value is stabilizing when the new learning value is substantially equal to a most recent learning value, and the permitting means allows the renewing of the learning value in one speed range when the learning value in another speed range is determined by the second determiner to be stabilizing.

37. An apparatus for detecting misfires in an internal combustion engine of a vehicle, the apparatus comprising:
a plurality of cylinders defined in the engine;
a piston accommodated in each cylinder to reciprocate in the cylinder;
a shaft connected with the pistons, the shaft being rotated by reciprocal movement of the pistons;
a speed sensor for detecting the rotating speed of the shaft;
a deviation computer for computing a deviation between earlier and later times of the rotating speed of the shaft at a selected portion of a cycle of a selected piston based on the detected speed of the shaft, wherein the deviation is affected by the load on the engine;

setting means for setting a learning value based on the computed deviation, wherein the learning value is a reference value used for detecting misfires in the cylinders;

a memory for storing the learning value;

a condition sensor for detecting a running condition of the engine, wherein the condition is indicative of the load of the engine;

learning means for renewing the learning value stored in the memory based on the detected condition of the engine; and a first determiner for determining whether a misfire has occurred in each cylinder based on a difference between the computed deviation and the learning value, wherein the learning means renews the learning value based on a most recent learning value and a previous learning value, the renewed learning value being a function of the most recent learning value and the previous learning value, the function being changed when a current learning value is drastically changed from the previous learning value.

38. The apparatus according to claim 37, wherein the most recent learning value is set as a new learning value when the most recent learning value is drastically changed from the previous learning value.

39. A method for detecting misfires in an internal combustion engine, the engine being cooled by coolant and having a plurality of cylinders defined in the engine, a piston accommodated in each cylinder to reciprocate in the cylinder, and a shaft connected with each piston, the shaft being rotated by the reciprocal movement of each piston, the method comprising:

detecting the rotating speed of the shaft;

computing the deviation between an earlier time and a later time of the rotating speed of the shaft for a selected portion of a cycle of a selected cylinder based on the detected speed of the shaft;

dividing a temperature range of the coolant into a plurality of sub-ranges;

setting a learning value for each sub-range based on the computed deviation, wherein the learning value is used for detecting the misfires in the engine, the learning value being set during fuel combustion and while the engine is loaded;

storing the learning value in a memory; and determining whether a misfire has occurred in the selected cylinder based on a difference between the deviation and the learning value.

40. A method for detecting misfires in an internal combustion engine, the engine having a plurality of cylinders defined in the engine, a piston accommodated in each cylinder to reciprocate in the cylinder, and a shaft connected with each piston, the shaft having a range of rotating speeds and being rotated by the reciprocal movement of each piston, the range being divided into a plurality of speed sub-ranges, the method comprising:

detecting the rotating speed of the shaft;

computing the deviation between an earlier time and a later time of the rotating speed of the shaft for a selected portion of a cycle of a selected cylinder based on the detected speed of the shaft;

setting a learning value for each speed sub-range based on the computed deviation, wherein the learning value is used for detecting the misfires in the engine, the learning value being set during fuel combustion and while the engine is loaded, each speed sub-range including a learning range within which renewal of the learning value is permitted and a prohibiting range in which the renewing of the learning value is prohibited, each learning range being narrower than the speed sub-range within which it is included;

storing the learning value in a memory; and determining whether a misfire has occurred in the selected cylinder based on a difference between the deviation and the learning value.

* * * * *